United States Patent [19]

Oka

[11] Patent Number: 5,197,073
[45] Date of Patent: Mar. 23, 1993

[54] SOLID-STATE LASER IN WHICH THE TWO POLARIZATION MODES OF THE FUNDAMENTAL WAVE LASER BEAM OSCILLATE IN A SINGLE LONGITUDINAL MODE

[75] Inventor: Michio Oka, Kanagawa, Japan
[73] Assignee: Sony Corporation, Tokyo, Japan
[21] Appl. No.: 701,506
[22] Filed: May 16, 1991
[30] Foreign Application Priority Data
May 16, 1990 [JP] Japan .................. 2-125854
[51] Int. Cl.⁵ .............................................. H01S 3/10
[52] U.S. Cl. .................................. 372/22; 372/32; 372/105; 372/106
[58] Field of Search ..................... 372/21, 22, 29, 32, 372/19, 92, 95, 105, 106, 75, 33, 31

[56] References Cited
U.S. PATENT DOCUMENTS 4,841,528  6/1989  Sipes et al. ................ 372/22
5,084,879  1/1992  Suzuki et al. .............. 372/22

Primary Examiner—James W. Davie
Attorney, Agent, or Firm—Lewis H. Eslinger; Jay H. Maioli

[57] ABSTRACT

A solid state laser apparatus in which a fundamental laser beam generated in a laser medium is resonated so as to pass a nonlinear optical crystal element provided within a resonator to thereby generate a secondary harmonic laser light and a first optical element for suppressing a coupling caused by a sum-frequency generation between two polarization modes of the fundamental wave laser beam is provided within the resonator includes of a control device for controlling an effective resonator length of the resonator such that the two polarization modes of the fundamental wave laser beam become the same in oscillation intensity. Therefore, a mode hopping noise caused by the mode coupling of the fundamental laser beam within the same polarization mode can be avoided and the oscillation can be stabilized.

11 Claims, 16 Drawing Sheets

SOLID-STATE LASER IN WHICH THE TWO POLARIZATION MODES OF THE FUNDAMENTAL WAVE LASER BEAM OSCILLATE IN A SINGLE LONGITUDINAL MODE

BACKGROUND OF THE INVENTION

1. Field of the Invention

The present invention generally relates to solid state laser oscillators and, more particularly, is directed to a solid state laser apparatus in which a fundamental wave laser beam produced in a laser medium is resonated so as to pass a nonlinear optical crystal element within a resonator to thereby produce a type II secondary harmonic laser beam.

2. Description of the Prior Art

A solid state laser oscillator is provided in the prior art to emit a laser beam of short wavelength by producing a secondary harmonic laser beam having frequency twice as high as that of a fundamental wave laser beam produced within a resonator of a solid state laser oscillator. Japanese Utility Model Laid-Open Publication No. 48-93784 describes such conventional solid state laser oscillator.

In this kind of solid state laser oscillator, the secondary harmonic laser beam is phase-matched with the fundamental wave laser beam within the nonlinear optical crystal element provided in the inside of the resonator including a laser medium, whereby the secondary harmonic laser beam can be produced efficiently.

In order to realize the phase-matching, the phase matching condition of the type I or type II must be established between the fundamental wave laser beam and the secondary harmonic laser beam.

The type I phase matching is based on the principle that one photon having twice as high a frequency is produced from two photons polarized in the same direction by utilizing ordinary ray of fundamental wave laser beam as shown by the following equation (1) expressed as:

$$n_{e(2w)} = \frac{1}{2}(n_{0(w)} + n_{0(w)}) \quad (1)$$

Therefore, if the fundamental wave laser beam is polarized and introduced under the condition such that the polarization direction of the fundamental wave laser beam is matched with the direction of the nonlinear optical crystal element by utilizing a polarizer such as a polarizing beam splitter or the like, in principle then the phase of the polarized components (p-wave component and s-wave component, which are referred to as intrinsic polarizations) of the fundamental wave laser beam emitted from the nonlinear optical crystal element can be prevented from being changed. Thus, the generation of the secondary harmonic laser beam can be stably continued by the fundamental wave laser beam which oscillates within the resonator.

Whereas, in the type II phase matching, two orthogonally polarized intrinsic fundamental wave beams are introduced into the nonlinear optical crystal element, whereby the phase matching conditions are established between the two intrinsic polarizations. Therefore, the fundamental wave laser beam is divided into ordinary ray and extraordinary ray in the inside of the nonlinear optical crystal element, to thereby cause the phase matching in the extraordinary ray of the secondary harmonic laser beam as shown by the following equation (2):

$$n_{e(2w)} = \frac{1}{2}(n_{e(w)} + n_{0(w)}) \quad (2)$$

In the equations (1) and (2), $n_{0(w)}$ and $n_{\theta(w)}$ represent the refractive indexes of the fundamental wave laser beams (frequency f=w) relative to the ordinary ray and the extraordinary ray and $n_{0(2w)}$ and $n_{\theta(2w)}$ represent refractive indexes of the secondary harmonic laser beam (frequency f=2w) relative to the ordinary ray and the extraordinary ray.

A conventional solid state laser oscillator in which the nonlinear optical element for performing the type II phase matching is provided within the resonator will be described with reference to FIG. 1 (see pp. 1175 to 1176 of [Large-Amplitude fluctuations due to longitudinal mode coupling in diode-pumped intracavity-doubled Nd:YAG lasers]written by T. Baer and published by Journal of Optical Society of America Inc., Vol. 3, No. 9/Sep. 1986/J.Opt.Soc.Am.B).

Referring to FIG. 1, there is seen a laser diode 1 which emits a laser beam of wavelength of 808 nm and whose power is 200 mW. The diverged laser beam from this laser diode 1 is collimated by a collimator lens (convex lens) 14 and converged by an objective lens 15.

A YAG laser rod 4 is provided as the aforenoted laser medium and a dichroic mirror D, treated by the vapor deposition method, is attached to the laser rod 4 at its rear end face opposing the objective lens 15. Incidentally, the dichroic mirror D permits the incident light from the objective lens 15-side to be passed therethrough and reflects the incident light from the opposite side, that is, from the front end side direction of the laser rod 4. One end face of the laser rod 4 is formed as a curved face having a converging lens effect.

The converged light from the objective lens 15 is introduced into the laser rod 4 (i.e., optical pumping) and focused at a point p so that the laser rod 4 emits an infrared light having a wavelength of 1064 nm (this infrared light having the wavelength of 1064 nm will hereinafter referred to as a fundamental wave light). A nonlinear optical crystal element 6 is made of KTP (KTiOPO4), that is, uniaxial crystal having one optical axis and a cube whose one side is 5 mm.

The optical crystal element 6 has an incident loss of about 0.5% when the wavelength of incident light is 1064 nm. Also, this optical crystal element 6 permits the laser beams having wavelength of 532 nm and 1064 nm to pass therethrough and further matches the phases of the fundamental wave light (1064 nm) and the secondary harmonic laser beam (output light) having the wavelength of 532 nm (type II phase matching). A concave mirror 3 is a dichroic concave mirror having high reflectivity (99.9%) for a laser beam having a wavelength of 1064 nm and which has high transmissivity (98%) of a laser beam having a wavelength of 532 nm.

The fundamental wave light from the laser rod 4 is reciprocated between the dichroic mirror D formed at the rear end face of the laser rod 4 and the concave mirror 3 (the length therebetween is 60 mm). In accordance with the reciprocation of the fundamental wave light, due to the pull-in phenomenon, the phase of the reciprocated light is arranged and then amplified (i.e., induced emission) so that the laser beam is oscillated, that is, the oscillation having the wavelength of 1064 nm occurs. An output level of a green laser beam (wavelength is 532 nm) of SHG (secondary harmonic generation or ½ multiple wavelength light) having a wavelength of 1064 nm falls in a range of from about 5 to 10 mW.

The fundamental wave light derived from the above laser rod 4 by the optical pumping is vertically introduced into the plane of the optical crystal element 6. The incident fundamental wave light is divided into two straight polarized components (ordinary ray and extraordinary ray) which are vibrated in the directions perpendicular to each other within the planes perpendicular to the travelling direction. Accordingly, each time the fundamental wave light derived from the laser rod 4 is reciprocated in the space within a resonator RS and is passed through the optical crystal element 6, the phases of the orthogonally polarized intrinsic beams (polarized beam formed of extraordinary ray component and polarized beam formed of ordinary ray component) are displaced from each other to cause a coupling so that energy is exchanged between the two polarized beams. As a result, outputs of the extraordinary ray and of the ordinary ray are fluctuated from a time standpoint and a noise is produced. Accordingly, a stable and strong resonation state in which a laser beam of 532 nm wavelength is obtained cannot be formed and a conversion efficiency at which the resonance wave light is converted into a laser beam having a wavelength of 532 nm is low.

As described above, in the example of the prior art of FIG. 1, when the secondary harmonic laser beam is generated by using the type II phase matching condition, the phases of the intrinsic polarized beams of the fundamental wave laser beam are fluctuated each time the fundamental laser beam is repeatedly travelled through the nonlinear optical crystal element. There is then the risk that the generation of the secondary harmonic laser beam cannot be continued stably.

More specifically, if the phases of the orthogonally polarized intrinsic beams (i.e., p-wave component and s-wave component) are respectively displaced from each other each time the fundamental wave laser beam generated in the laser medium is repeatedly travelled through the nonlinear optical crystal element by the resonating operation, then a stationary state in which the fundamental wave laser beams efficiently intensify with each other in the respective portions of the resonator cannot be obtained, so that the strong resonance state (i.e., strong standing wave) cannot be formed. In consequence, the conversion efficiency in which the fundamental wave laser beam is converted into the secondary harmonic laser beam is deteriorated and there is then the risk that a noise will occur in the secondary harmonic laser beam.

Therefore, a solid state laser oscillator (laser light source) is proposed, in which the fundamental wave laser beam is stably resonated within the resonator under the condition that the type II phase matching condition is satisfied. This solid state laser oscillator is disclosed in Japanese Patent Laid-Open Publication No. 1-220879.

This conventional solid laser oscillator will be described with reference to FIG. 2. In FIG. 2, like parts corresponding to those of FIG. 1 are marked with the same references and therefore need not be described in detail.

As shown in FIG. 2, this solid state laser oscillator includes the Nd:YAG laser rod (laser medium) 4 which produces the fundamental wave laser light $LA_{(w)}$ by receiving the excitation laser beam emitted from the laser diode 1 to the light incident surface thereof through the collimator lens 14 and the objective lens 15.

This fundamental wave laser beam $LA_{(w)}$ is travelled through the nonlinear optical crystal element 6 formed of KTP (KTiOPO$_4$), for example, a quarter-wave plate formed of a crystal plate and a birefringence element 16, in that order, and reflected on the reflecting plane of the concave mirror (dichroic mirror) 3. Then, the reflected fundamental wave laser beam is again travelled through the birefringence element 16, the nonlinear optical crystal element 6 and the laser rod 4 and then reflected on the reflecting plane (dichroic mirror) D of the laser rod 4.

Thus, the fundamental wave laser beam $LA_{(w)}$ is resonated so as to reciprocate in the resonance optical path formed between the reflecting plane (dichroic mirror) D of the laser rod medium 4 and the reflecting plane of the concave mirror 3, thereby constructing the resonator RS between the reflecting plane D and the concave mirror 3.

The birefringence element 16 is set at the optical axis position such that the direction of the extraordinary ray direction refractive index $n_{\theta(7)}$ is inclined by an azimuth angle of $\theta=45$ degrees relative to the direction of the extraordinary ray direction refractive index $n_{\theta(6)}$ within the plane vertical to the propagation direction of light as shown in FIG. 3.

With the above-mentioned arrangement, when the fundamental wave laser light $LA_{(w)}$ travels through the nonlinear optical crystal element 6 via the resonant optical path, this fundamental wave laser light $LA_{(w)}$ produces the secondary harmonic laser beam $LA_{(2w)}$. This secondary harmonic laser beam $LA_{(2w)}$ is travelled through the concave mirror 3 and transmitted as an output laser beam $LA_{OUT}$.

Under this condition, respective rays constituting the fundamental laser beam $LA_{(w)}$ are travelled through the birefringence element 16 located at the position displaced by the azimuth angle of $\theta=45$ degrees relative to the nonlinear optical crystal element 6, thereby the power of the laser beams in the respective portions of the resonator are stabilized to a predetermined level.

Experimental results in the example of the prior art shown in FIG. 2 will be described as follows.

More specifically, into the resonator RS in which the Nd:YAG laser rod 4 is excited by the laser diode 1, the birefringence element 16 formed of the quarter-wave plate was inserted relative to the wavelength of the fundamental wave laser beam $LA_{(w)}$ (wavelength is 1.06 μm) of the nonlinear optical crystal element 6 formed of KTP (KTiOPO$_4$) and the resonator RS.

With this arrangement, under the conditions that the birefringence element 16 is placed at the position of the azimuth angle $\theta=0$ degree (i.e., the optical axis of the extraordinary ray direction of the birefringence element 16 is made coincident with the optical axis of the extraordinary ray direction of the nonlinear optical crystal element 6) and that the azimuth angle $\theta$ is rotated by 45 degrees (i.e., $\theta=45$ degrees), an extraordinary ray component $E_{\theta(w)}$ and an ordinary ray component $E_{O(w)}$ of the fundamental wave laser beam $LA_{(w)}$ and the secondary harmonic laser beam $LA_{(2w)}$ were respectively detected by a photodetector.

As a result, the extraordinary ray component $E_{\theta(w)}$ and the ordinary ray component $E_{0(w)}$ of the fundamental wave laser beam $LA_{(w)}$ in the first state where $\theta=0$ degree demonstrated unstable changes with time t as shown in FIGS. 4A and 4B.

It was understood that the extraordinary ray component $E_{\theta(w)}$ and the ordinary ray component $E_{0(w)}$ have correlation therebetween because of the occurrence of mode competition.

Further, it was understood from FIG. 4C that the output $P_{(2w)}$ of the secondary harmonic laser beam $LA_{(2w)}$ produced in response to the fundamental laser beam $LA_{(w)}$ whose power level is unstably fluctuated with time t presents unstable fluctuation such as when the power level thereof is considerably fluctuated in a range from the high frequency component to the low frequency component.

Whereas, it was understood that, under the second state that the azimuth angle $\theta$ of the birefringence 16 is set to $\theta=45$ degrees, the extraordinary ray component $E_{\theta(w)}$ and the ordinary ray component $E_{0(w)}$ of the fundamental wave laser beam $LA_{(w)}$ are stabilized so as to present substantially constant values with time t as shown in FIG. 5A and 5B. Also, it was understood that the output $P_{(2w)}$ of the secondary harmonic laser beam $LA_{(2w)}$ produced by the stabilized fundamental wave laser beam $LA_{(w)}$ is stabilized to substantially a constant value as shown in FIG. 5C.

Since the fundamental wave laser beam $LA_{(w)}$ resonating through the resonant optical path is not rectilinearly polarized by the polarizing element or the like, the fundamental wave laser beam $LA_{(w)}$ brings the two orthogonally polarized two intrinsic beams in the fundamental wave mode, and these two intrinsic polarized beams become random polarized beams which are free from the phase relation between the two modes.

When the secondary harmonic laser beam $LA_{(2w)}$ is produced within the nonlinear optical crystal element 6 by such fundamental wave laser beam $LA_{(w)}$, then the output $P_{(2w)}$ becomes proportional to a product of the extraordinary ray component output $P_{\theta(w)}$ and the ordinary ray component output $P_{0(w)}$ of the fundamental wave laser beam $LA_{(w)}$ within the nonlinear optical crystal element 6 as expressed by the following equation (3)

$$P_{(2w)} \propto d^2 \cdot P_{\theta(w)} \cdot P_{0(w)} \tag{3}$$

where $d^2$ is the proportional constant.

However, when the output $P_{(2w)}$ is expressed by the product of the extraordinary ray component output $P_{\theta(w)}$ and the ordinary ray component output $P_{0(w)}$, a coupling occurs between the two intrinsic polarizations (i.e., polarizations formed of the extraordinary ray component and of the ordinary ray component) so that the energy is interchanged between the two polarizations.

If the energy is interchanged between the two polarizations, i.e., the extraordinary ray component and the ordinary ray component within the nonlinear optical crystal element 6, the outputs $P_{\theta(w)}$ and $P_{0(w)}$ of the extraordinary ray component and the ordinary ray component are fluctuated with time t, thus resulting in the secondary harmonic output $P_{(2w)}$ generated in the non-linear optical crystal element 6 being made unstable.

That is, in the arrangement in which the azimuth angle $\theta$ of the birefringence element 16 is selected to be $\theta=0$ degree, the output laser beam $LA_{OUT}$ contains a noise component of very large energy which cannot be used in actual practice as shown in FIG. 6A.

It is to be noted that the noise spectrum of the output laser beam $LA_{OUT}$ contains a noise of about 53 dB when the frequency f is about 5 MHz, as shown by a curve K1 in FIG. 6B.

While the azimuth angle $\theta$ of the birefringence element 16 is set to $\theta=45$ degrees, it was understood that the output laser beam $LA_{OUT}$ provides a stabilized signal whose noise component is sufficiently suppressed as shown in FIG. 7A. Also, it was understood that the noise spectrum thereof was improved in S/N (signal-to-noise) ratio by about 80 dB when the frequency f is 5 MHz as shown by a curve K2 in FIG. 7B.

It will be clear from the above experimental results that, according to the solid state laser apparatus of FIG. 2, when the secondary harmonic laser beam $LA_{(2w)}$ is generated within the nonlinear optical crystal element 6 under the type II phase matching condition, the azimuth angle $\theta$ of the birefringence element 16 is selected to be 45 degrees so that the coupling phenomenon can be prevented from being produced between two propagations of the fundamental laser beam $LA_{(w)}$ which propagates the resonance optical path of the resonator RS. In consequence, the output laser beam $LA_{OUT}$ formed of the secondary harmonic laser beam $LA_{(2w)}$ can be stabilized.

Therefore, since the orthogonally polarized two intrinsic beams within the resonance optical path of the resonator are brought in the fundamental wave mode and the fundamental wave laser beam $LA_{(w)}$ of the randomly polarized beam having no correlation with the phase relation between the two modes can be resonated, the extra polarizer need not be interposed, thus simplifying the whole arrangement more.

When the secondary harmonic laser beam $LA_{(2w)}$ is generated within the nonlinear optical crystal element 6 under the type II phase matching condition as shown in FIG. 2, the resonance operation is stabilized by inserting the birefringence element 16 into the azumuth angle position of the azimuth angle $\theta$ of 45 degrees. The reason for this is understood from a theoretical standpoint as follows:

That is, within the resonator RS, the following rate equations are established when the above two modes are established:

$$\tau_c \frac{dI_1}{dt} = (G_1 - \alpha_1 - \epsilon_1 I_1 - 2\epsilon_2 I_2)I_1 \tag{4}$$

$$\tau_f \frac{dG_1}{dt} = -(\beta I_1 + \beta_{12} I_2 + 1)G_1 + G_1^0 \tag{5}$$

$$\tau_c \frac{dI_2}{dt} = (G_2 - \alpha_2 - \epsilon_1 I_2 - 2\epsilon_2 I_1)I_2 \tag{6}$$

$$\tau_f = -(\beta I_2 \beta_{21} I_1 + 1)G_2 + G_2^0 \tag{7}$$

where $\tau_o$ is the reciprocating time of the resonator, $\tau_f$ is the fluorescent life, $\alpha_1$ and $\alpha_2$ the loss coefficients in the two modes, respectively, $\epsilon_1$ is the loss coefficient caused by the occurrence of the secondary harmonic component in each mode, $\epsilon_2$ is the loss coefficient caused by the occurrence of sum frequency between the two modes, $\beta$ is the saturation parameter, $G_1^0$ and $G_2^0$ are the small signal gains in the two modes, respectively, $I_1$ and $I_2$ the light intensities in the two modes, respectively, $G_1$ and $G_2$ are the gains in the two modes, respectively, and $\beta_{12}$ and $\beta_{21}$ the cross-saturation parameters in the two modes, respectively.

In association with the above rate equations, there is known a paper which pointed out that the resonating operation of the resonator becomes unstable because of the coupling in the multilongitudinal modes. That is, the rate equation with respect to the coupling between the multilongitudinal modes is described in PP. 1175 to 1180 of "Large-Amplitude fluctuations due to longitudinal mode coupling in diode-pumped intracavity-doubled Nd:YAG lasers" written by T. Baer and published by Journal of Optical Society of America Inc. Vol. 3, No. 9/Sep. 1986/J.Opt. Soc. Am.B.

The rate equation in this paper can be similarly applied to the two intrinsic polarization modes so that the equations (4) to (7) can be established with respect to the two intrinsic polarization modes.

Of the equations (4) to (7), the equations (4) and (6) involve a multiplying term $(-2\epsilon_2 I_1 I_2)$ which have the light intensities $I_1$ and $I_2$ of the two intrinsic polarization modes, whereby the light intensities of the two intrinsic polarization modes in the inside of the resonator are coupled with each other. In this connection, the equations (4) and (6) express the relation such that when the light intensity $I_1$ (or $I_2$) is fluctuated, the light intensity $I_2$ (or $I_1$) is also fluctuated.

However, the coefficient $\epsilon_2$ in the multiplying term of $-2\epsilon_2 I_1 I_2$ satisfies $\epsilon_2=0$ when the azimuth angle $\theta$ is selected so as to satisfy $\theta=45$ degrees. Whereas, when the azimuth angle $\theta$ is selected to be $\theta \neq 45$ degrees, the coefficient $\epsilon_2$ takes the values other than 0, which can be proved as follows. Under this condition, the multiplying term of $-2\epsilon_2 I_1 I_2$ can be erased from the rate equations (4) and (6) so that the resonating operations expressed by the equations (4) and (6) can be stabilized.

Initially, let us consider that $\theta=0$ degree is selected as one example of the general conditions where the azimuth angle $\theta$ is selected so as to satisfy $\theta \neq 45$ degrees.

Electric field vectors $E_1$ and $E_2$ of two intrinsic polarization of beams incident on the nonlinear optical crystal element 6 at that time are incident on the nonlinear optical crystal element 6 under the condition such that they become coincident with the ordinary ray o and the extraordinary ray e of the nonlinear optical crystal element 6. Accordingly, expressing the incident electric field vectors $E_1$ and $E_2$ by Jones vector where the ordinary ray axis o of the nonlinear optical crystal element 6 is taken as an x axis and the extraordinary ray axis e is taken as y axis yields the following equations (8) and (9):

$$E_1 = E_1 \begin{bmatrix} 1 \\ 0 \end{bmatrix} \quad (8)$$

$$E_2 = E_2 \begin{bmatrix} 0 \\ 1 \end{bmatrix} \quad (9)$$

where Jones vector is expressed only by coefficients omitting the phase term.

Thus, time average value $\bar{P}_{(w)}$ of the fundamental wave laser beam $LA_{(w)}$ within the resonator CAV can be expressed as the sum of the square of the magnitudes $E_1$ and $E_2$ of electric fields by the following equation (10):

$$\begin{aligned} P_{(w)} &= (E_1 + E_2)(E_1 + E_2)^* \\ &= E_1 E_1^* + E_2 E_2^* + E_1 E_2^* + E_2 E_1^* \\ &= |E_1|^2 + |E_2|^2 \\ &= P_1 + P_2 \end{aligned} \quad (10)$$

where $(E_1+E_2)^*$ and $E_1+$ and $E_2^*$ represent conjugated vectors of $(E_1+E_2)$, $E_1$ and $E_2$, respectively.

In the equation (10), when terms to be multiplied with each other have values having strong correlation, or in the case of $E_1$ and $E_2$, time average values $\bar{E}_1^*$ and $\bar{E}_2^*$ are expressed by the following equations (11) and (12):

$$\bar{E}_1 E_1^* = |E_1|^2 = P_1 \quad (11)$$

$$\bar{E}_2 E_2^* = |E_2|^2 = P_2 \quad (12)$$

Whereas, in the case of $E_1 E_2^*$ and $E_2 E_1^*$, the electric fields $E_1$ and $E_2$ expressed by the multiplying terms are, respectively, electric field components of the two intrinsic orthogonally polarized modes. Further, due to random polarization having no correlation for the phase relation between the two modes, they lost correlation therebetween and in consequence, the time values become 0 as expressed by the following equations (13) and (14):

$$\bar{E}_1 E_2^* = 0 \quad (13)$$

$$\bar{E}_2 E_1^* = 0 \quad (14)$$

The electric field $E_{(2w)}$ of the secondary harmonic laser beam $LA_{(2w)}$ can be expressed, in the case of the type II phase matching, by the following equation (15):

$$E_{(2w)} = d E_1 E_2 \quad (15)$$

where d is the nonlinear conversion efficiency of the nonlinear optical crystal element 6.

The time average value $\bar{P}_{(2w)}$ of the power of the secondary harmonic laser beam $LA_{(2w)}$ can be expressed by the product of powers of the two intrinsic polarizations:

$$\begin{aligned} P_{(2w)} &= (d E_1 E_2)(d E_1^* E_2^*) \\ &= d^2 (E_1 E_1^*)(E_2 E_2^*) \\ &= d^2 |E_1|^2 |E_2|^2 \\ &= d^2 P_1 P_2 \end{aligned} \quad (16)$$

Also in this case, the relationships expressed by the equations (11) to (14) can be established.

Therefore, when the azimuth angle $\theta$ is selected to be zero degree, the power of the resonator becomes the sum of the power $P_1+P_2$ of the fundamental wave laser beam $LA_{(w)}$ expressed with respect to the equation (10) and the power $d^2 P_1 P_2$ of the secondary harmonic laser beam $LA_{(2w)}$ expressed by the equation (16).

Comparing this relationship with the equations (4) and (6), it is to be noted that the light intensities $I_1$ and $I_2$ in the equations (4) and (6) have the same meaning as those of the powers $P_1$ and $P_2$ in the equations (10) and (16) and that the equation (4) includes the term [i.e., $(G_1-\alpha_1)I_1$] of the light intensity $I_1$, the term (i.e., $-\epsilon I_1^2$) of $I_1^2$ and the multiplying term (i.e., $-2\epsilon_2 I_1 I_2$) of $I_1$ and $I_2$ and the equation (6) includes the term (i.e., $\epsilon_1 I_2^2$) of $I_2$ and the multiplying term (i.e., $-2\epsilon_2 I_1 I_2$) of $I_1 I_2$.

Accordingly, it is to be understood that, when $\epsilon_1$ is selected to be zero ($\epsilon_1 = 0$) in the equations (4) and (6), the sum of the equations (4) and (6) has the same term as the sum of the equations (10) and (16).

Thus, when the azimuth angle $\theta$ of the birefringence element 7 is selected to be zero ($\theta = 0$ degree), this setting is equivalent to the fact that the constant $\epsilon_1$ is set to zero ($\epsilon_1 = 0°$) in the general equations of the equations (4) and (6). However, when the azimuth angle $\theta$ is selected to be 0 degree ($\theta = 0$), the multiplying term $-2\epsilon_2 I_1 I_2$ of the light intensities $I_1$ and $I_2$ of the two fundamental wave modes cannot be erased because $\epsilon_2 \neq 0$. Accordingly, when the azimuth angle $\theta$ is selected to be zero ($\theta = 0°$) as shown in FIG. 8, the resonant operation of the resonator expressed by the rate equations of the equations (4) and (6) cannot be stabilized.

In the solid state laser resonator shown in FIG. 2, when the azimuth angle $\theta$ of the birefringence element 16 is selected to be 45 degrees ($\theta = 45°$), this means that, as shown in FIG. 9, the intrinsic polarizations $E_1$ and $E_2$ of the fundamental wave laser beam $LA_{(w)}$ within the resonator are set to the azimuth angle positions which are rotated relative to the ordinary ray axis o and the extraordinary ray axis e of the nonlinear optical crystal element 6. This can be proved by the equation (17) because of the following reasons.

As a result, the intrinsic vectors E1 and E2 can be expressed by the following Jones vectors:

$$E_1 = E_1 \frac{\sqrt{2}}{2} \begin{bmatrix} 1 \\ 1 \end{bmatrix} \tag{17}$$

$$E_2 = E_2 \frac{\sqrt{2}}{2} \begin{bmatrix} 1 \\ -1 \end{bmatrix} \tag{18}$$

Accordingly, the time average value $\overline{P}_{(w)}$ of the power of the fundamental wave laser beam LA(w) of the resonator CAV can be expressed similarly to the equations (10) to (14) as follows:

$$\begin{aligned} P_{(w)} &= (E_1 + E_2)(E_1 + E_2)^* \\ &= E_1 E_1^* + E_2 E_2^* + E_1 E_2^* + E_2 E_1 \\ &= |E_1|^2 + |E_2|^2 \\ &= P_1 + P_2 \end{aligned} \tag{19}$$

Whereas, the electric field $E_{(2w)}$ of the secondary harmonic laser beam $LA_{(2w)}$ generated under the type II phase matching condition is expressed by the following equation (20) with reference to the components of the ordinary ray axis o and the extraordinary ray axis e:

$$\begin{aligned} E_{(2w)} &= d \frac{\sqrt{2}}{2}(E_1 + E_2) \cdot \frac{\sqrt{2}}{2}(E_1 - E_2) \\ &= \frac{1}{2} d(E_1^2 + E_2^2) \end{aligned} \tag{20}$$

From the equation (20), the time average value $\overline{P}_{(2w)}$ of the power $P_{(2w)}$ of the secondary harmonic laser beam $LA_{(2w)}$ can be expressed as follows:

$$\begin{aligned} P_{(2w)} &= \frac{1}{4} d^2 (E_1^2 - E_2^2)(E_1^2 - E_2^2)^* \\ &= \frac{1}{4} d^2 (E_1^2 E_1^{*2} + E_2^2 E_2^{*2} - E_1^2 E_2^{*2} - E_2^2 E_1^{*2}) \\ &= \frac{1}{4} d^2 (|E_1|^4 + |E_2|^4) \end{aligned} \tag{21}$$

where the following equations are established:

$$E_1^2 E_1^{*2} = |E_1|^4 = P_1^2 \tag{22}$$

$$E_2^2 E_2^{*2} = |E_2|^4 = P_2^2 \tag{23}$$

$$E_1^2 E_2^{*2} = 0 \tag{24}$$

$$E_2^2 E_1^{*2} = 0 \tag{25}$$

In this connection, since the terms of $\overline{E_1^2 E_1^{*2}}$ and $\overline{E_2^2 E_2^{*2}}$ of the equation (21) have the equations in which $E_1$, $E_1^*$ and $E_2$, $E_2^*$ each having strong correlation are multiplied, the resultant time average value does not become zero but becomes equal to the square of the powers $P_1$ and $P_2$.

Whereas, since the electric fields $E_1$, $E_2^*$ and $E_2$, $E_1^{*2}$ are respective electric field components of the two orthogonally intrinsic polarization modes and are also the random polarizations which are not correlated with the phase relationship between the two modes, these electric fields are not correlated with each other, thereby the time average values of the terms of $E_1^2 E_2^{*2}$ and $E_2^2 E_1^{*2}$ being made zero.

Having compared the sum of the time average value $\overline{P}_{(w)}$ (the equation (19)) of the power $P_{(w)}$ of the fundamental wave laser beam $LA_{(w)}$ produced when the azimuth angle $\theta$ of the birefringence element 16 is selected to be 45 degrees ($\theta = 45°$) and the time average value $\overline{P}_{(2w)}$ (the equation (21)) of the power $P_{(2w)}$ of the secondary harmonic laser beam $LA_{(2w)}$ with the sum of the equations (4) and (6), it is to be noted that, when the coefficient $\epsilon_2$ of the multiplying terms of the light intensities $I_1$ and $I_2$ is selected to be zero ($\epsilon_2 =$)) in the equations (4) and (6), the respective terms of the sum of the equations (19) and (20) correspond with the respective terms of the sum of the equations (4) and (6) in a one-to-one relation.

This means that the fact that the azimuth angle $\theta$ of the birefringence element 16 shown in FIG. 2 is selected to be 45 degrees ($\theta = 45°$) is equivalent to the fact such that the coefficient $\epsilon_2$ is selected to be zero ($\epsilon_2 = 0$) in the equations (4) and (6) expressed as the general equations. If the above-mentioned conditions are set, then it will be possible to obtain the resonant condition expressed by the rate equation which avoids the term expressed by the product of the respective light intensities $I_1$ and $I_2$ of the two fundamental wave modes in the equations (4) and (6), thereby inhibiting the energy from being interchanged through the occurrence of the secondary harmonic laser beam between the light intensities $I_1$ and $I_2$ of the two fundamental wave modes. Therefore, the secondary harmonic laser beam $LA_{(2w)}$ can be stabilized in accordance with the fundamental wave laser beam $LA_{(w)}$.

The above conditions can be established if the birefringence element 16 in which the azimuth angle $\theta$ is selected to be 45 degrees ($\theta = 45°$) and the phase amount $\Delta$ is selected to be 90 degrees ($\Delta = 90°$) is selected.

That is, as shown in FIG. 10, if the phase is deviated by a phase amount $\delta$ by the birefringence when the fundamental wave laser beam $LA_{(w)}$ passes the nonlinear optical crystal element 6, then the corresponding polarization state will be expressed by Jones matrix $C(\delta)$ as in the following equation (26):

$$C(\delta) = \begin{bmatrix} \exp(i\,\delta/2) & 0 \\ 0 & \exp(-i\,\delta/2) \end{bmatrix} \tag{26}$$

Further, since the birefringence element 16 is rotated by the azimuth angle $\theta$, the polarization state of the fundamental wave laser beam $LA_{(w)}$ can be expressed by Jones matrix $R(\theta)$ as in the following equation (27)

$$R(\theta) = \begin{bmatrix} \cos\theta & -\sin\theta \\ \sin\theta & \cos\theta \end{bmatrix}$$

Further, the polarization state in which the fundamental laser beam $LA_{(w)}$ is optically rotated by the phase amount $\Delta$ by the birefringence element 16 can be expressed by Jones matrix $C(\Delta)$ as in the following equation (28):

$$C(\Delta) = \begin{bmatrix} \exp(i\,\Delta/2) & 0 \\ 0 & \exp(-i\,\Delta/2) \end{bmatrix} \tag{28}$$

Therefore, the change of the polarization state in which the fundamental wave laser beam $LA_{(w)}$ emitted from the laser rod 4 travels sequentially through the nonlinear optical crystal element 6 and the birefringence element 16 and introduced into the incident surface of the concave mirror 3 and reflected by the incident surface to return through the birefringence element 16 and the nonlinear optical crystal element 6 to the laser rod 4 side can be expressed by Jones matrix M as in the following equation (29):

$$M = C(\delta)R(\theta)C(\Delta)C(\Delta)R(-\theta)C(\delta) \tag{29}$$

Substituting the equations (26) to (28) into the equation (29) yields the following Jones matrix M which expresses the polarization state of the optical system:

$$M = \begin{bmatrix} \exp(i\,\delta/2) & 0 \\ 0 & \exp(-i\,\delta/2) \end{bmatrix} \cdot \begin{bmatrix} \cos\theta & -\sin\theta \\ \sin\theta & \cos\theta \end{bmatrix} \cdot \tag{3}$$

$$\begin{bmatrix} \exp(i\,\Delta/2) & 0 \\ 0 & \exp(-i\,\Delta/2) \end{bmatrix} \cdot \begin{bmatrix} \exp(i\,\Delta/2) & 0 \\ 0 & \exp(-i\,\Delta/2) \end{bmatrix} \cdot$$

$$\begin{bmatrix} \cos\theta & \sin\theta \\ -\sin\theta & \cos\theta \end{bmatrix} \cdot \begin{bmatrix} \exp(i\,\delta/2) & 0 \\ 0 & \exp(-i\,\delta/2) \end{bmatrix}$$

Performing operation under the condition such that Jones matrix of the second to fifth terms on the right side of the equation (29) is taken as matrix M1, we have:

$$\begin{aligned} M1 &= R(\theta)C(\Delta)C(\Delta)R(-\theta) \\ &= R(\theta)C(2\Delta)R(-\theta) \end{aligned} \tag{31}$$

$$= \begin{bmatrix} \cos\theta & -\sin\theta \\ \sin\theta & \cos\theta \end{bmatrix} \cdot \begin{bmatrix} \exp(i\,\Delta) & 0 \\ 0 & \exp(-i\,\Delta) \end{bmatrix} \cdot \begin{bmatrix} \cos\theta & \sin\theta \\ -\sin\theta & \cos\theta \end{bmatrix} = \begin{bmatrix} \cos\theta & -\sin\theta \\ \sin\theta & \cos\theta \end{bmatrix} \cdot \begin{bmatrix} \exp(i\,\Delta)\cos\theta & \exp(i\,\Delta)\sin\theta \\ -\exp(-i\,\Delta)\sin\theta & \exp(-i\,\Delta)\cos\theta \end{bmatrix}$$

$$= \begin{bmatrix} \exp(i\,\Delta)\cos^2\theta + \exp(-i\,\Delta)\sin^2\theta & (\exp(i\,\Delta) - \exp(-i\,\Delta))\sin\theta\cos\theta \\ (\exp(i\,\Delta) - \exp(-i\,\Delta))\sin\theta\cos\theta & \exp(-i\,\Delta)\cos^2\theta + \exp(i\,\Delta)\sin^2\theta \end{bmatrix}$$

$$= \begin{bmatrix} \cos\Delta + i\sin\Delta\cos2\theta & i\sin\Delta\sin2\theta \\ i\sin\Delta\sin2\theta & \cos\Delta - i\sin\Delta\cos2\theta \end{bmatrix}$$

Substituting the calculated result into the equation (29), we have:

$$M = C(\delta) \cdot M1 \cdot C(\delta) \tag{32}$$

$$= \begin{bmatrix} \exp(i\,\delta/2) & 0 \\ 0 & \exp(-i\,\delta/2) \end{bmatrix} \cdot \begin{bmatrix} \exp(i\,\delta/2)(\cos\Delta + i\sin\Delta\cos2\theta) & \exp(-i\,\delta/2)\sin\Delta\sin2\theta \\ \exp(i\,\delta/2)i\sin\Delta\sin2\theta & \exp(-i\,\delta/2)(\cos\Delta - i\sin\Delta\cos2\theta) \end{bmatrix}$$

$$= \begin{bmatrix} \exp(i\,\delta)(\cos\Delta + i\sin\Delta\cos2\theta) & i\sin\Delta\sin2\theta \\ i\sin\Delta\sin2\theta & \exp(-i\,\delta)(\cos\Delta - i\sin\Delta\cos2\theta) \end{bmatrix}$$

Then, the matrix M expressing the polarized state is put as:

$$M = \begin{bmatrix} A & B \\ C & D \end{bmatrix} \tag{33}$$

and an intrinsic value $\lambda$ relative to the intrinsic vector X is calculated:

$$MX = \lambda X \tag{34}$$

The intrinsic value $\lambda$ which satisfies the equation (34) should satisfy the following determinant (35):

$$\begin{vmatrix} A - \lambda & B \\ C & D - \lambda \end{vmatrix} = 0 \tag{35}$$

Then, opening this determinant (35), we have:

$$(A-\lambda)(D-\lambda)-BC=0 \quad (36)$$

$$\lambda^2-(A+D)\lambda+AD-BC=0 \quad (37)$$

Accordingly, it is to be understood that the quadratic equation with respect to $\lambda$ may be solved. A solution of the equation (37) becomes:

$$\lambda = \frac{(A+D) \pm \sqrt{(A+D)^2 - 4(AD-BC)}}{2} \quad (38)$$

From the equations (32) and (33), $A+D$ can be arranged as:

$$\begin{aligned}A+D &= \exp(i\delta)(\cos\Delta + i\sin\Delta\cos2\theta) + \\ & \quad \exp(-i\delta)(\cos\Delta - i\sin\Delta\cos2\theta) \\ &= 2\cos\delta\cos\Delta + i\sin\Delta\cos2\theta(2i\sin\delta) \\ &= 2(\cos\delta\cos\Delta - \sin\delta\sin\Delta\cos2\theta)\end{aligned} \quad (39)$$

Further, $AD-BC$ can be arranged as in the following equation (40):

$$\begin{aligned}AD - BC &= \cos^2\Delta + \sin^2\Delta\cos^22\theta + \sin^2\Delta\sin^22\theta \\ &= 1\end{aligned} \quad (40)$$

Accordingly, substituting the equations (39) and (40) into the equation (38), we have the intrinsic value $\lambda$ which is expressed as:

$$\lambda = -(\cos\delta\cos\Delta - \sin\delta\sin\Delta\cos2\theta) \pm \sqrt{(\cos\delta\cos\Delta - \sin\delta\sin\Delta\cos2\theta)^2 - 1} \quad (41)$$

Therefore, if the x component of the intrinsic vector X is set to 1 ($x=1$), the intrinsic vector X can be expressed as:

$$X = \begin{bmatrix} x \\ y \end{bmatrix} = \begin{bmatrix} 1 \\ -\frac{A-\lambda}{B} \end{bmatrix} \quad (42)$$

Incidentally, in the solid state laser apparatus shown in FIG. 2, the azimuth angle $\theta$ of the birefringence element 16 is selected to be 45 degrees ($\theta=45°$) and the phase angle $\Delta$ of the birefringence element 16 is selected to be 90 degrees ($\Delta=90°$). Accordingly, putting $$\theta=45° \quad (43)$$

$$\Delta=90° \quad (44)$$

into the equations (32) and (33) yields the following matrix M:

$$M = \begin{bmatrix} A & B \\ C & D \end{bmatrix} = \begin{bmatrix} 0 & i \\ i & 0 \end{bmatrix} \quad (45)$$

Also, the equation (41) yields the intrinsic value $\lambda$ expressed as:

$$\lambda = \pm i \quad (46)$$

Consequently, the intrinsic vector x can be obtained as:

$$X = \begin{bmatrix} x \\ y \end{bmatrix} = \begin{bmatrix} 1 \\ \pm 1 \end{bmatrix} \quad (47)$$

It is clear from the above-mentioned results that, if the azimuth angle $\theta$ is selected to be 45 degrees ($\theta=45°$) and the phase amount $\Delta$ is selected to be 90 degrees ($\Delta=90°$) with respect to the equations (43) and (44) as described above, then this means that, when the intrinsic polarized vectors $E_1$ and $E_2$ of the fundamental wave laser beam $LA_{(w)}$ within the resonator CAV becomes incident on the nonlinear optical crystal element 6 from the laser medium 2 side, the intrinsic polarized vectors $E_1$ and $E_2$ are set at the azimuth angle positions which are rotated by 45 degrees relative to the ordinary ray axis o and the extraordinary ray axis e of the nonlinear optical crystal element 6.

As a result of the consideration from a theoretical standpoint, it is to be noted that the azimuth angle $\theta$ of the birefringence element 16 is selected to be 45 degrees ($\theta=45°$), whereby the secondary harmonic laser beam $LA_{(2w)}$ can be stabilized in accordance with the fundamental wave laser beam $LA_{(w)}$ of the resonator CAV.

According to the conventional solid state laser apparatus shown in FIG. 2, the fundamental laser beam generated in the laser medium (laser rod) 4 is resonated so as to pass the nonlinear optical crystal element 6 provided within the resonator RS, thereby generating the type II secondary harmonic laser beam. Also, since the optical means for suppressing the coupling produced due to the occurrence of the sum frequency between the two polarization modes of the fundamental laser beam, that is, the birefringence element (quarter-wave plate) 16 is provided within the resonator RS, the coupling produced due to the occurrence of the sum frequency between the two polarization modes of the fundamental laser beam can be suppressed, thus resulting in the oscillation being stabilized.

According to the prior-art solid state laser apparatus as described above, however, if the multilongitudinal mode exists within the same polarization mode of the fundamental laser beam, there is then the risk that a mode hopping noise will occur due to the mode coupling within the same polarization mode.

OBJECTS AND SUMMARY OF THE INVENTION

Accordingly, it is an object of the present invention to provide an improved solid state laser apparatus in which the aforenoted shortcomings and disadvantages encountered with the prior art can be eliminated.

More specifically, it is an object of the present invention to provide a solid state laser apparatus in which a mode hopping noise can be avoided.

It is another object of the present invention to provide a solid state laser apparatus in which oscillation can be stabilized.

As a first aspect of the present invention, a solid state laser apparatus in which a fundamental laser beam generated in a laser medium is resonated so as to pass a nonlinear optical crystal element provided within a resonator to thereby generate a secondary harmonic laser light and first optical device for suppressing a coupling caused by a sum-frequency generation between two polarization modes of the fundamental wave laser beam is provided within the resonator is comprised of a second optical device for causing the two polarization modes of the fundamental wave laser beam to respectively oscillate in a single longitudinal mode, and a control device for controlling an effective resonator length of the resonator such that the two polarization modes of the fundamental wave laser beam become the same in oscillation intensity.

In accordance with a second aspect of the present invention, a solid state laser apparatus in which a fundamental laser beam generated in a laser medium is resonated so as to pass a nonlinear optical crystal element provided within a resonator to thereby generate a secondary harmonic laser light and first optical device for suppressing a coupling caused by a sum-frequency generation between two polarization modes of the fundamental wave laser beam is provided within the resonator is comprised of a control device for controlling an effective resonator length of the resonator such that the two polarization modes of the fundamental wave laser beam become the same in oscillation intensity.

In accordance with a third aspect of the present invention, a solid state laser apparatus, in which a fundamental laser beam generated in a laser medium is resonated so as to pass a nonlinear optical crystal element provided within a resonator to thereby generate a secondary harmonic laser light and a birefringence optical element optical element for suppressing a coupling caused by a sum-frequency generation between two polarization modes of the fundamental wave laser beam is provided within the resonator, is comprised of an optical device provided within the resonator for causing the two polarization modes of the fundamental wave laser beam to respectively oscillate in a single longitudinal mode.

The above and other objects, features, and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Figure 1:
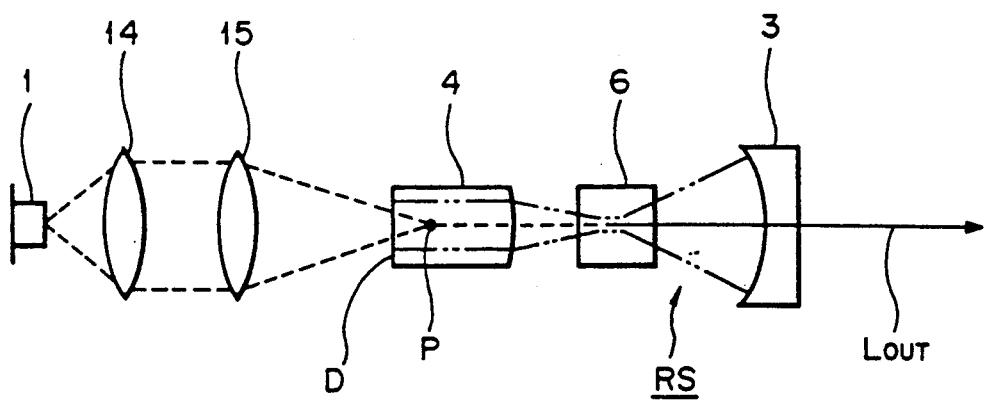
FIGS. 1 and 2 are schematic diagrams showing, respectively arrangements of solid state laser apparatus according to the prior art.
Figure 2:
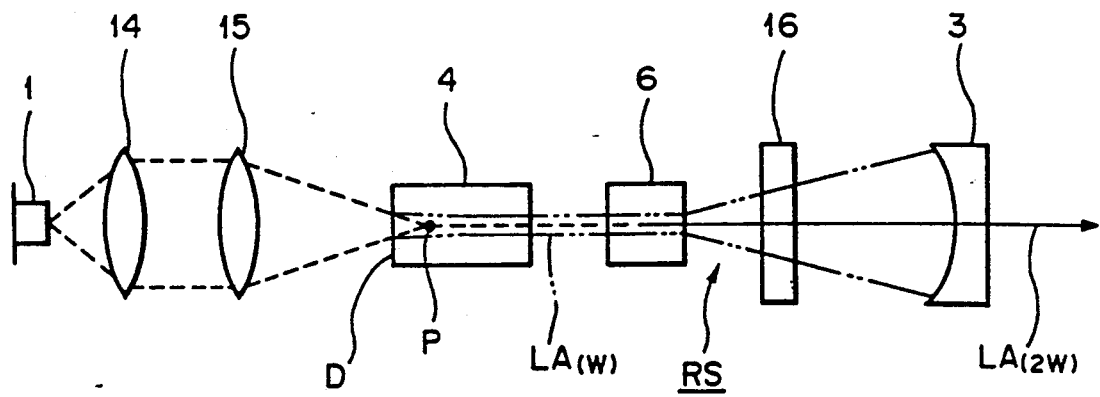
Figure 3:
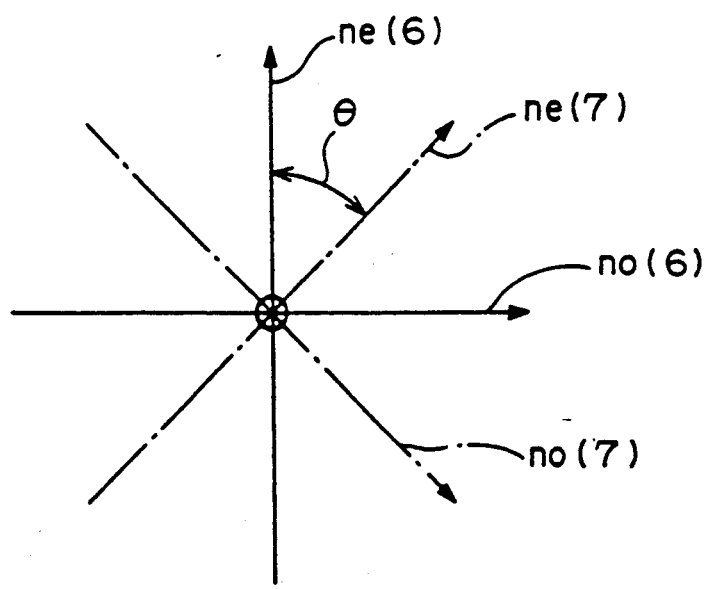
FIG. 3 is a plot used to explain an azimuth angle of a birefringence element used in the conventional solid state laser apparatus of FIG. 2.
Figure 4A:
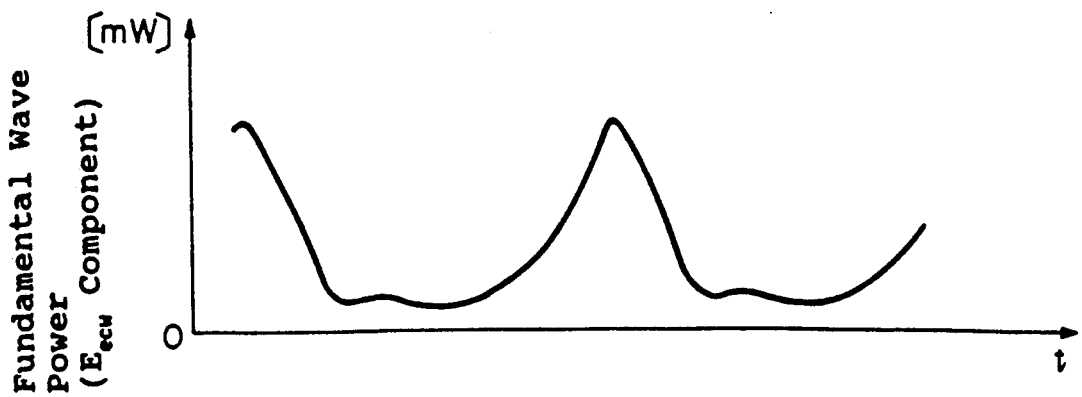
FIGS. 4A–4C, FIGS. 5A–5C, FIGS. 6A, 6B and FIGS. 7A, 7B are respectively graphs graphing experimental results of the conventional solid state laser apparatus.
Figure 4B:
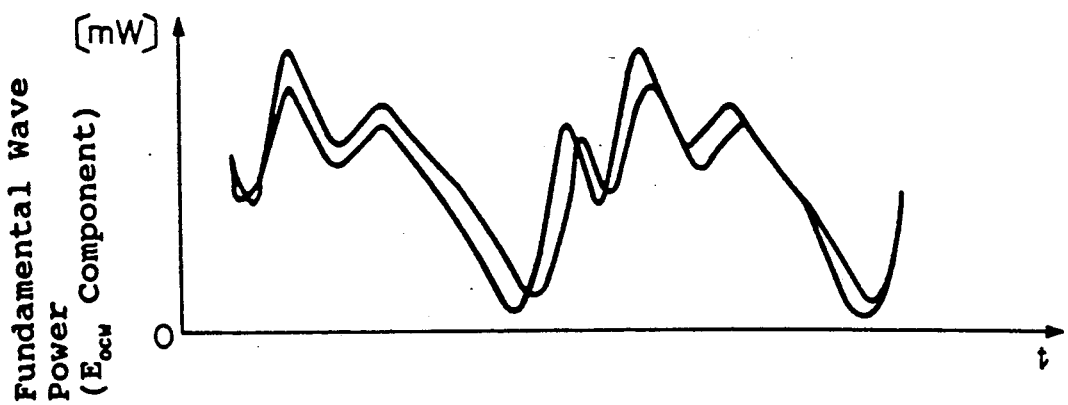
Figure 4C:
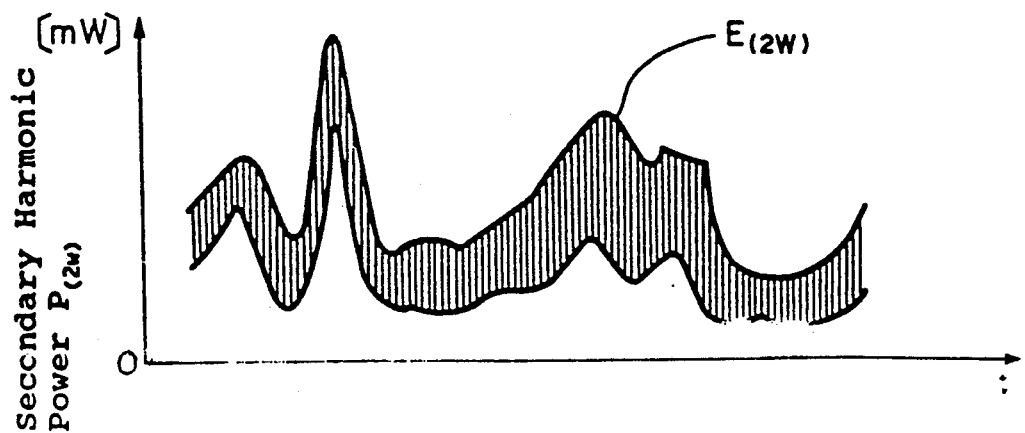
Figure 5A:
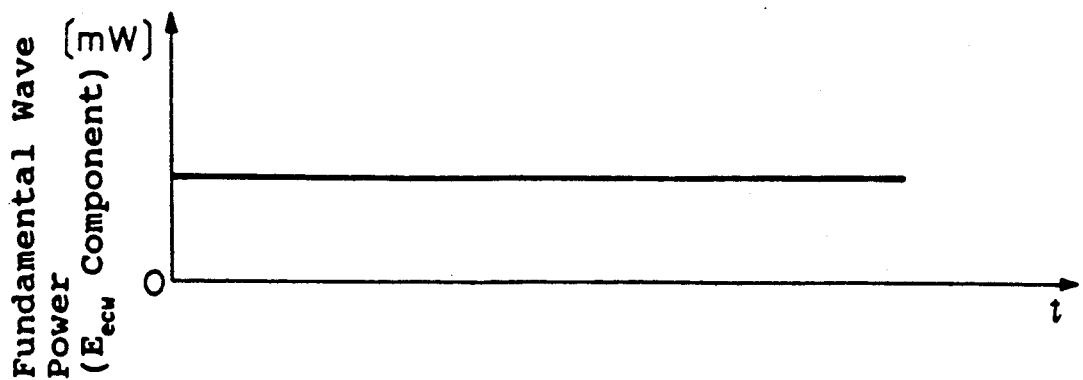
Figure 5B:
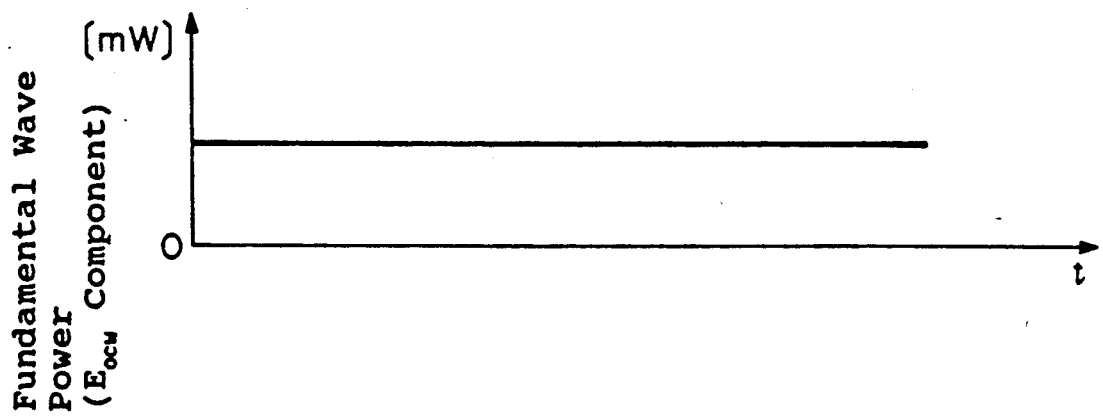
Figure 5C:
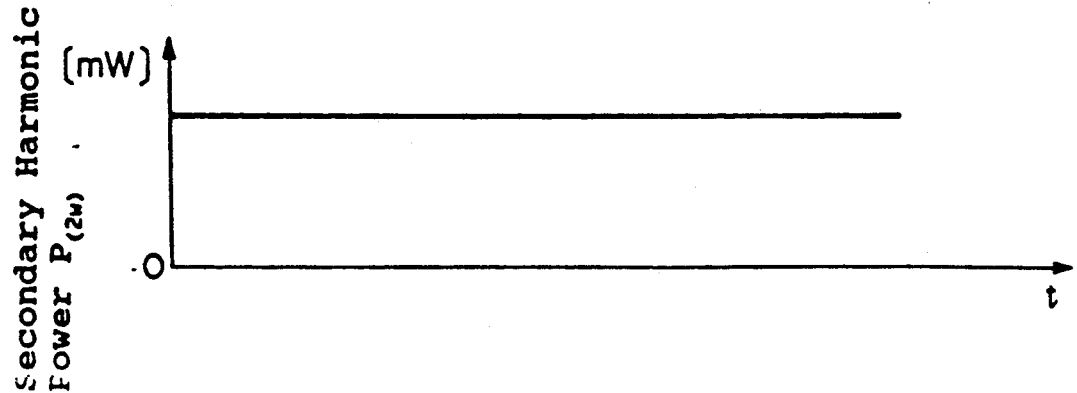
Figure 6A:
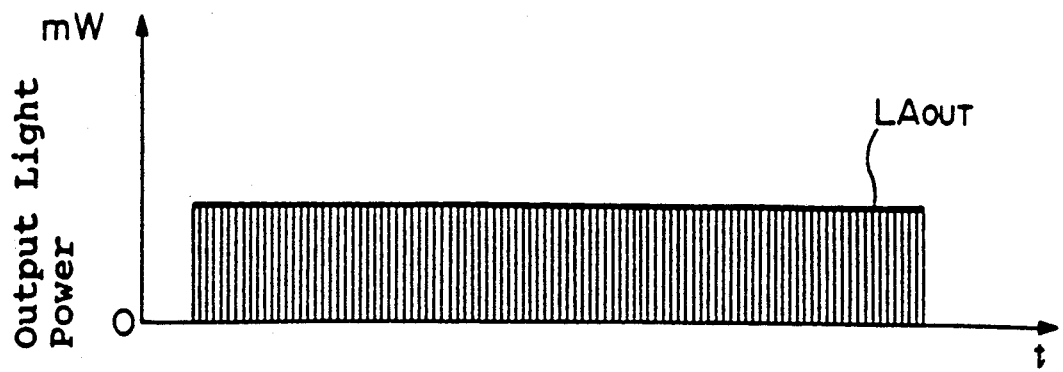
Figure 6B:
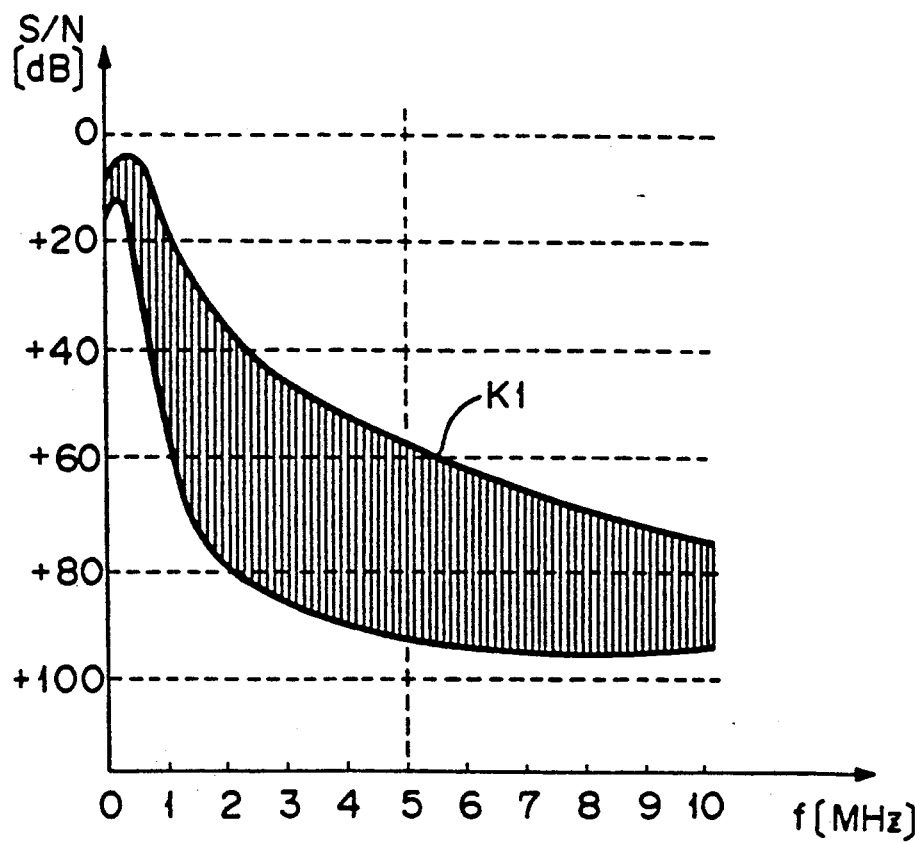
Figure 7A:
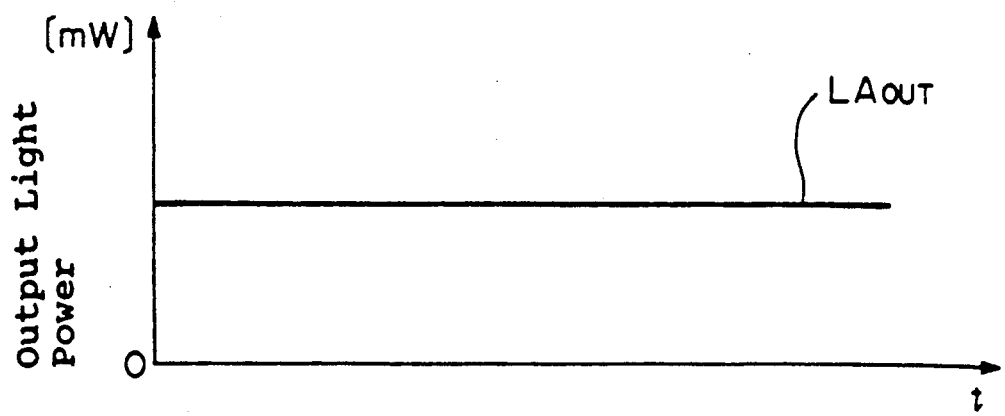
Figure 7B:
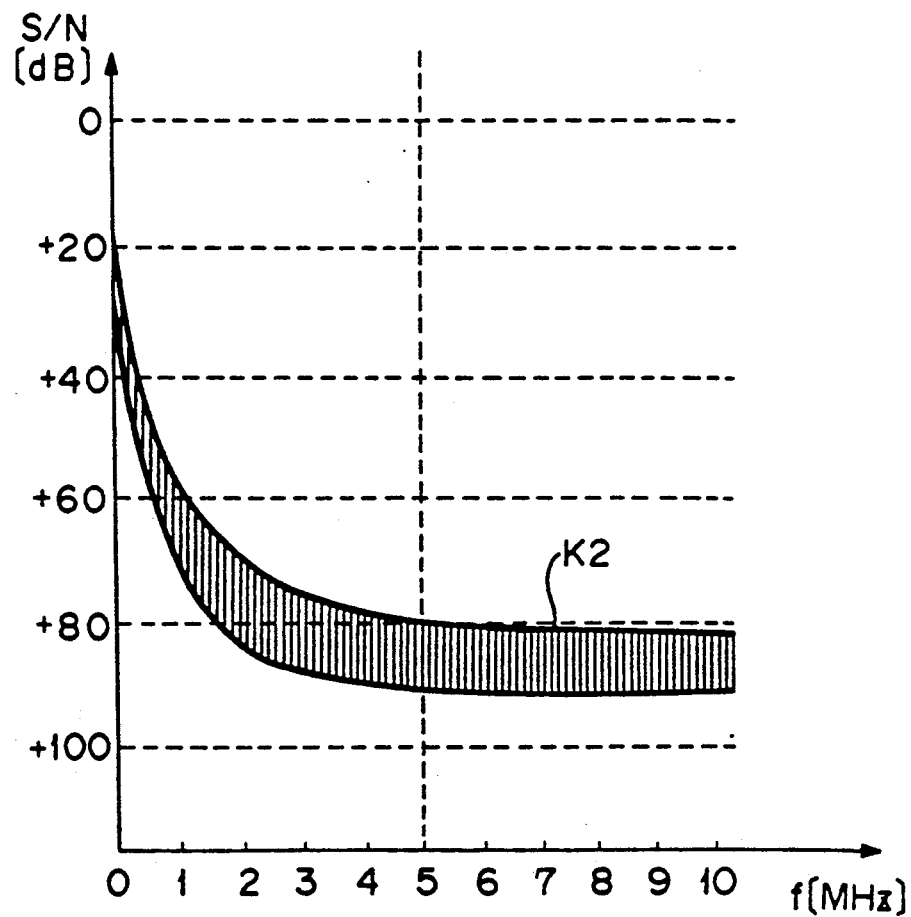
Figure 8:
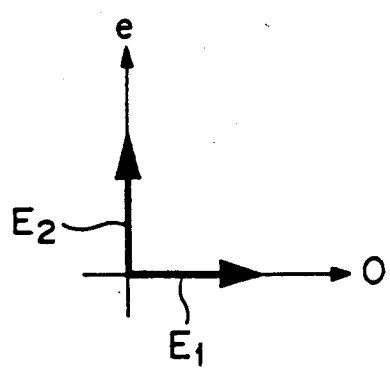
FIGS. 8 and 9 are plots, respectively, showing intrinsic polarization states when the azimuth angles $\theta$ are selected to be $\theta$ degree and 45 degrees.
Figure 9:
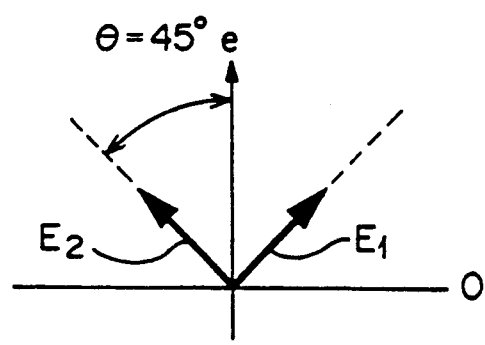
Figure 10:
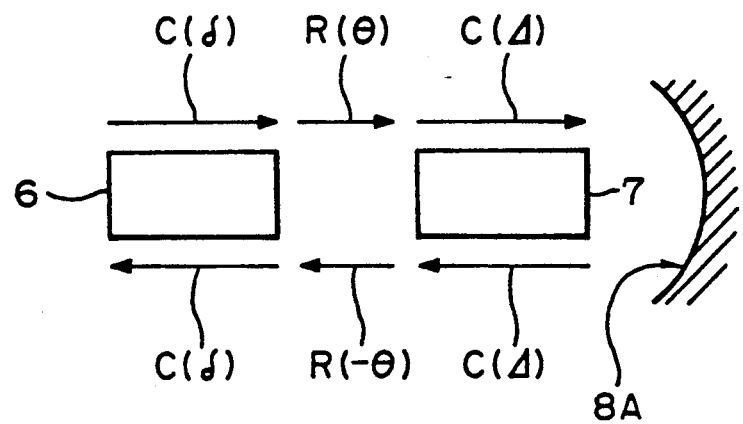
FIG. 10 is a pictorial representation used to explain the polarization state of a fundamental wave laser beam within a resonator.

Referring to the drawings in detail, and initially to FIG. 11, a first embodiment of the solid state laser apparatus according to the present invention will be described hereinafter. The solid state laser apparatus of the first embodiment is designed so as to generate a secondary harmonic laser beam having a frequency twice as high as the frequency of a fundamental wave laser beam generated within a resonator to thereby establish the type II phase matching condition between the fundamental laser beam and the secondary harmonic laser beam.

Figure 11:
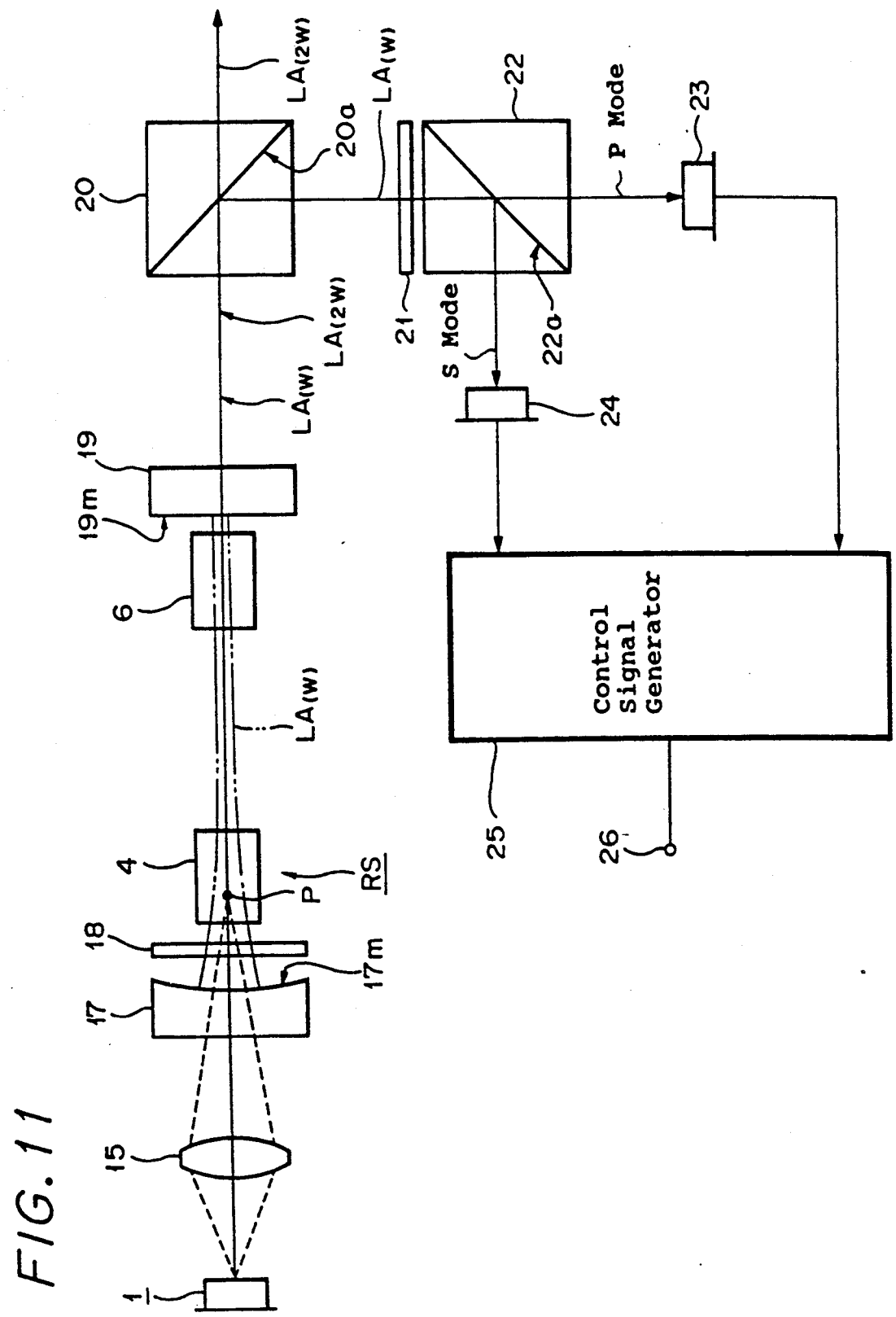
FIG. 11 is a schematic diagram showing an entire arrangement of a first embodiment of a solid state laser apparatus according to the present invention.

As FIG. 11 shows, a resonator RS is composed of a concave mirror (dichroic mirror) 17, a quarter-wave plate (birefringence element) 18 formed of crystal or the like, a laser rod (formed of Nd:YAG laser) 4 provided as a laser medium, a nonlinear optical crystal element [KTP (KTiOP$_4$) (formed of uniaxial crystal having a single optical axis)] 6 and a plane mirror (dichroic mirror) 19.

An excitation laser beam having a wavelength of 808 nm and a power of 200 mW is emitted from a laser diode 1, converged by an objective lens 15 and is introduced through the concave mirror 17 and the quarter-wave plate 18 into the laser rod 4 such that it is focused on a point P within the laser rod 4. Thus, the laser rod 4 generates a fundamental wave laser beam (infrared ray) having a wavelength of 1064 nm.

The quarter-wave plate 18 is located at the optical axis position such that, within the plane vertical to the light beam propagation direction, the direction of refractive index of the extraordinary ray direction thereof is inclined by the azimuth angle of 45 degrees relative to the direction of the refractive index of the extraordinary ray direction of the nonlinear optical crystal element 6.

The concave mirror 17 has high transmissivity relative to the laser beam having wavelength of 808 nm and high reflectivity relative to the laser beams having wavelengths of 1064 nm and 532 nm.

Whereas, the plane mirror 19 has high reflectivity relative to the laser beam having wavelength of 1064 nm and high transmissivity relative to the laser beam having wavelength of 532 nm.

The optical crystal element 6 permits the laser beams having the wavelengths of 1064 nm and 532 nm to pass therethrough and also matches the phase of the fundamental wave laser beam having the wavelength of 1064 nm and the phase of the secondary harmonic laser beam thereof, that is, the laser beam having the wavelength of 1064 nm.

The fundamental laser beam $LA_{(w)}$ from the laser rod 4 travels through the nonlinear optical crystal element 6 and becomes incident on a mirror plane 19m of the plane mirror 19, in which it is reflected and introduced into a mirror plane 17m of the concave mirror 17 through the nonlinear optical crystal element 6, the laser rod 4 and the quarter-wave plate 18. Then, this fundamental laser beam $LA_{(w)}$ incident on the mirror plane 17m of the concave mirror 17 is thereby reflected and introduced through the quarter-wave plate 18, the laser rod 4 and the nonlinear optical crystal element 6 into the mirror plane 19m of the plane mirror 19, in which it is reflected. The above operations are repeated to thereby cause the oscillation. When the fundamental wave laser beam $LA_{(w)}$ passes the nonlinear optical crystal element 6, a secondary harmonic laser beam (green laser beam) $LA_{(2w)}$ is generated, passed through the plane mirror 19 and output from the resonator RS. Incidentally, the fundamental wave laser beam $LA_{(w)}$ is formed of p-mode component and s-mode component whose polarization directions are different from each other by 90 degrees. One portion of the fundamental wave laser beam is outputted to the outside of the resonator RS from the plane mirror 19.

The fundamental wave laser beam $LA_{(w)}$ and the secondary harmonic laser beam $LA_{(2w)}$ from the plane mirror 19 become incident on a beam splitter 20, in which the secondary harmonic laser beam $LA_{(2w)}$ is not affected and passed therethrough but the fundamental wave laser beam $LA_{(w)}$ is reflected on a reflection plane 20a of the beam splitter 20 so that the optical path thereof is polarized by 90 degrees. Thereafter, the resultant fundamental wave laser beam $LA_{(2w)}$ is introduced into a polarizing beam splitter 22 via a half-wave plate 21.

Since the p-mode component and the s-mode component of the fundamental wave laser beam $LA_{(w)}$ outputted from the plane mirror 19 are oriented in the direction inclined by ±45 degrees relative to the surface of the sheet of drawing, the polarization direction of the fundamental wave laser beam $LA_{(w)}$ is rotated by 45 degrees by the half-wave plate 21 and introduced into the polarization beam splitter 22, whereby the p-mode and s-mode polarized beams are introduced into photodetectors 23 and 24. Then, detected outputs from the photo-detectors 23 and 24 are supplied to a control signal generating circuit 25, from which a control signal which makes the detection levels equal is fed to an output terminal 26. This control signal is supplied from the output terminal 26 to a resonator length control apparatus which will be described below.

An example of a resonator length control apparatus will be described with reference to FIG. 12A. The resonator length control apparatus is adapted to control the optical path length between the mirror surface 17m of the concave mirror 17 and the mirror surface 19m of the plane mirror 19 of the resonator RS.

Figure 12A:
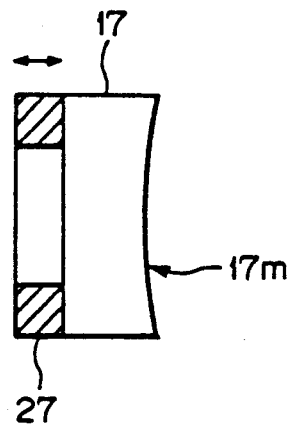
FIGS. 12A and 12B are representations of resonator length control apparatus used in the present invention.

As shown in FIG. 12A, this resonator length control apparatus is formed of a piezoelectric element 27 of annular configuration such as PZT (Pb-based Zirconate Titanates) bonded to the concave mirror 17 (the plane mirror 19 also may be used) at its side opposite to the mirror surface 17m. When supplied with a DC voltage based on the control signal, the resonator length control apparatus is energized to move the concave mirror 17 in the optical path length direction of the resonator RS. The resonator length is controlled in a range of from about 40 mm±several micrometers.

Figure 12B:
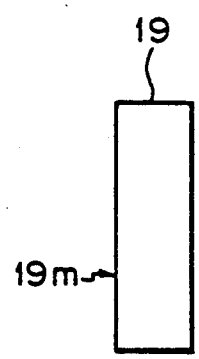

Another example of the resonator length control apparatus will be described below in relation to FIG. 12B.

Parts of the resonator are wholly or partly housed in a box whose temperature can be controlled. Then, the temperature within the box is changed by the control signal from the above control signal generating circuit 25, thereby the optical path length between the mirror surface 17m of the concave mirror 17 and the mirror surface 19m of the plane mirror 19 in the resonator RS being controlled.

Still another example of the resonator length control apparatus will be described below. An electrooptical crystal having electrooptical effect is provided, for example, between the laser rod 4 and the nonlinear optical crystal element 6 within the resonator RS shown in FIG. 11. The electrooptical crystal is applied with the DC voltage by the control signal from the above control signal generating circuit 25, whereby the optical path length between the mirror surface 17m of the concave mirror 17 and the mirror surface 19m of the plane mirror 19 in the resonator RS is controlled.

A further example of the resonator length control apparatus will be described next.

A pressure is applied to the quarter-wave plate 18, the laser rod or the nonlinear optical crystal element 6 forming the resonator RS in response to the control signal from the above control signal generating circuit to thereby control the optical path length between the mirror surface 17m of the concave mirror 17 and the mirror surface 19m of the plane mirror 19 in the resonator RS.

A yet further example of the resonator length control apparatus will be described below.

An optical element having a wedge is provided, for example, between the laser rod 4 and the nonlinear optical crystal element 6 within the resonator RS shown in FIG. 11 and the optical element is moved in the lateral direction in response to the control signal from the above control signal generating circuit 25, thereby the optical path length between the mirror surface 17m of the concave mirror 17 and the mirror surface 19m of the plane mirror 19 in the resonator RS being controlled.

Figure 13A:
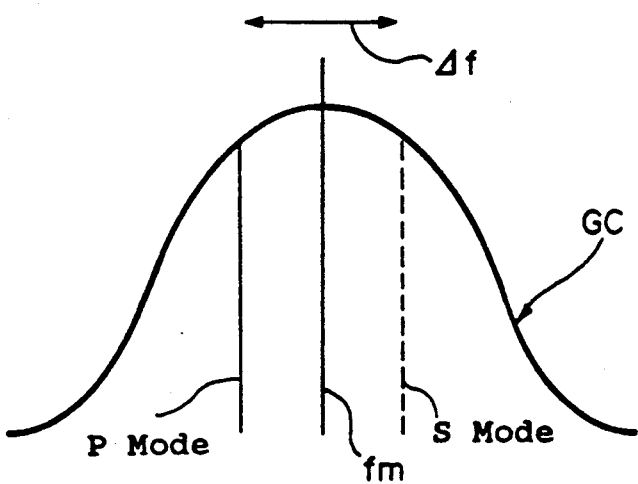
FIGS. 13A and 13B are diagrams used to explain an optical path length of a resonator, respectively.

In short, as shown in FIG. 13A, the optical path length between the mirror surface 17m of the concave mirror 17 and the mirror surface 19m of the plane mirror 19 in the resonator RS is controlled such that frequencies of p-mode and s-mode are allocated at frequency positions of $fm\pm\Delta f/2$ relative to the maximum gain frequency fm of gain curve (frequency characteristic curve of gain) GC.

Figure 13B:
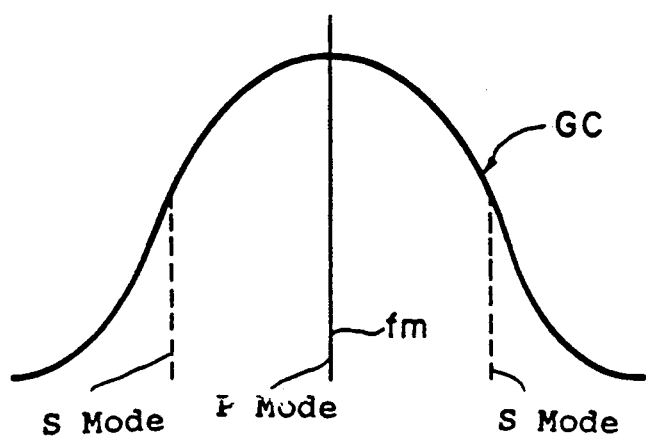

Further, as shown in FIG. 13B, if the resonator length is deviated by ¼ wavelength, the frequency of the p-mode (or s-mode) is allocated at the frequency position of the maximum gain frequency fm of the gain curve GC so that the mode competition occurs between the s-modes (or p-modes) of the respective sides. For this reason, the control range of the resonator length is preferably selected to be less than ¼ wavelength of the fundamental wave laser beam.

Figure 14:
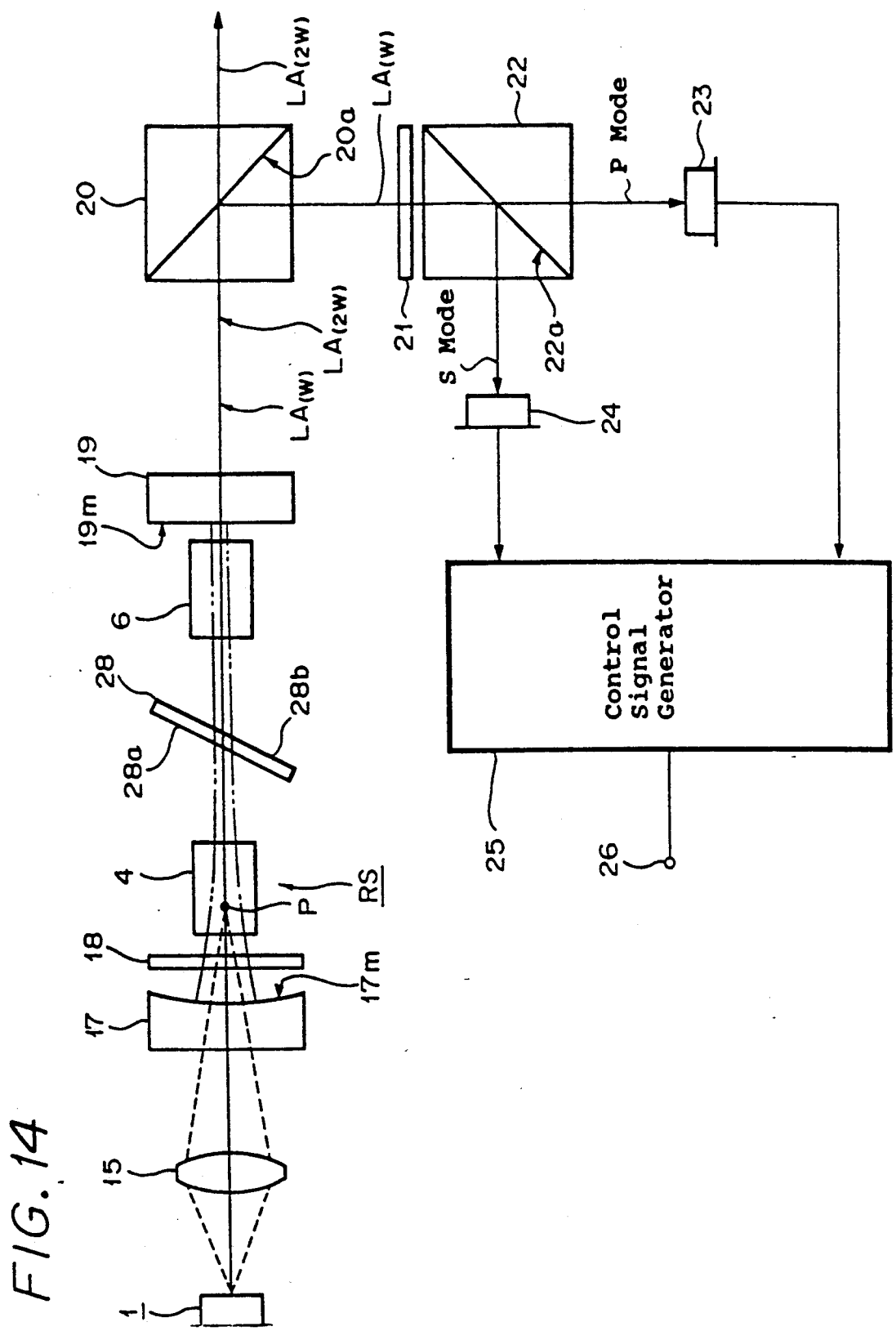
FIG. 14 is a schematic diagram showing a part of a second embodiment of the solid state laser apparatus according to the present invention.

An apparatus for oscillating the polarized beams of the two modes of the fundamental wave laser beam of the resonator in the single longitudinal mode will be described with reference to FIG. 14. In FIG. 14, like parts corresponding to those of FIG. 11 are marked with the same references and therefore need not be described in detail.

Referring to FIG. 14, an etalon 28 is provided between the laser rod 4 and the nonlinear optical crystal element 6 of the resonator RS as an optical element having a wavelength selecting function. When the laser rod 4 is the Nd:YAG laser, the wavelength of the fundamental wave oscillation laser beam is 1064 nm and the gain frequency width is about 180 (GHz). The longitudinal mode frequency interval $\Delta f$ is expressed by the following equation:

$$\Delta f = c/2L$$

where c is the speed of light and L is the resonator length (effective resonator length). In this case, if L is selected to be 40 mm, then the longitudinal mode frequency interval $\Delta f$ will becomes 3.75 (GHz).

Since the quarter-wave plate 18 is provided within the resonator RS and the optical path difference of ¼ wavelength exists between the p-mode and the s-mode, a frequency difference of $\Delta f/2$ occurs between the p-mode and the s-mode.

Figure 15:
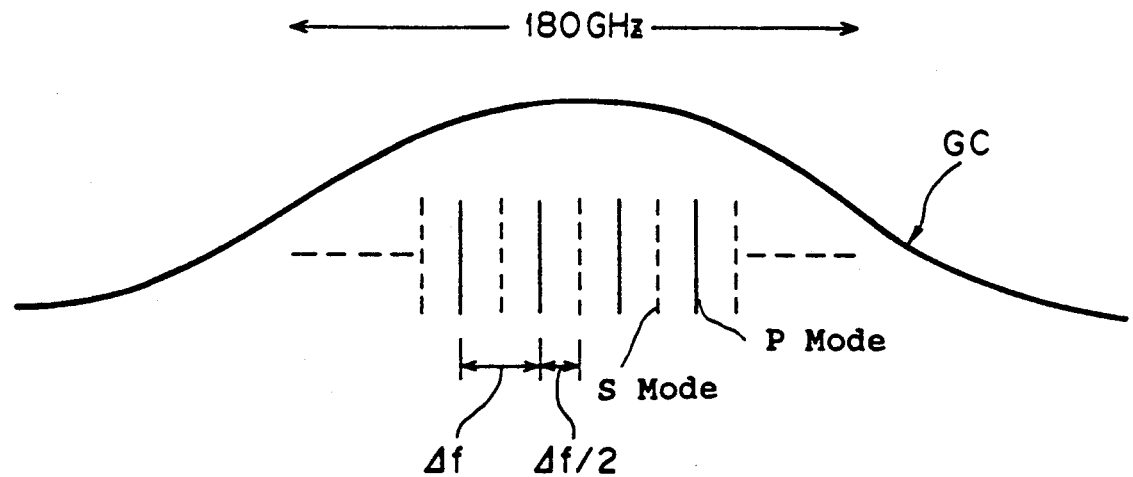
FIG. 15 is a plot showing a relation between a gain and p-mode and s-mode.

FIG. 15 illustrates a relation among the gain curve (frequency characteristic of gain) GC of the fundamental wave laser beam $LA_{(w)}$ and frequencies of the p-mode and the s-mode when the laser rod 4 is the Nd:YAG laser.

When the relation among the gain curve CG of the fundamental wave laser beam $LA_{(w)}$ and the frequencies of the p mode and the s-mode is represented in FIG. 15, if the laser apparatus is a homogeneous line broadening laser apparatus, the oscillation of the polarized beam closest to the peak of the gain will occur and the gain will be saturated. Therefore, it is supposed that the single mode oscillation will occur but in actual practice, a multi-mode oscillation occurs due to a hole-burning effect.

Figure 16:
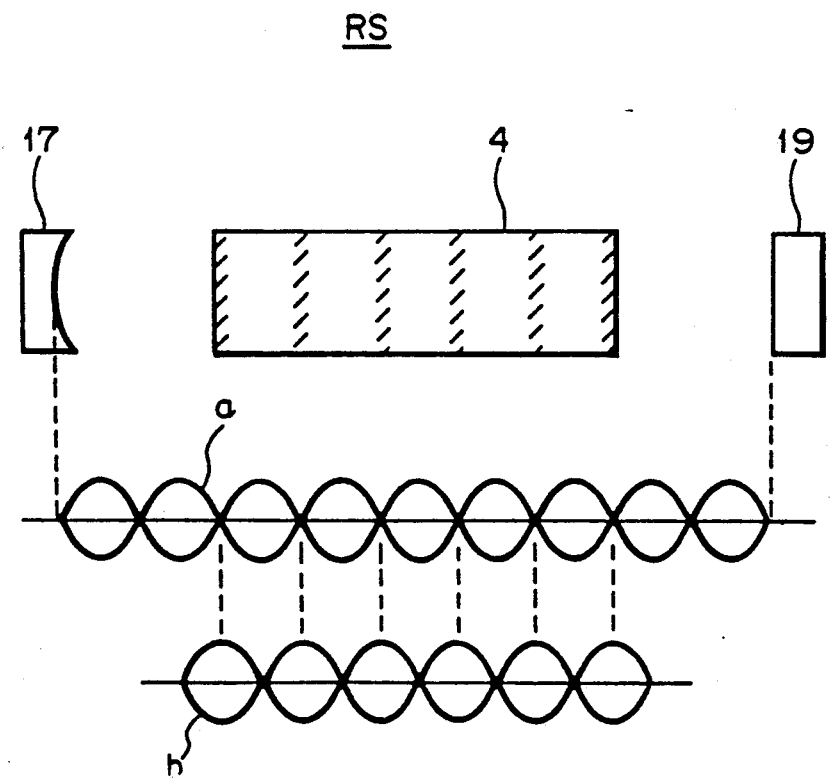
FIG. 16 is a pictorial representation used to explain hole-burning effect.

A hole-burning effect will be described with reference to FIG. 16. As shown in FIG. 16, in the case of a standing wave resonator, a standing wave a exists within the resonator RS and gain is not sufficiently saturated at the node portion of the standing wave a so that an oscillation of different mode occurs, that is, the multi-mode oscillation occurs.

Accordingly, if the etalon 28 is interposed within the resonator RS as shown in FIG. 14, then the multi-mode oscillation can be suppressed by a difference of loss brought about by the wavelength.

Figure 17:
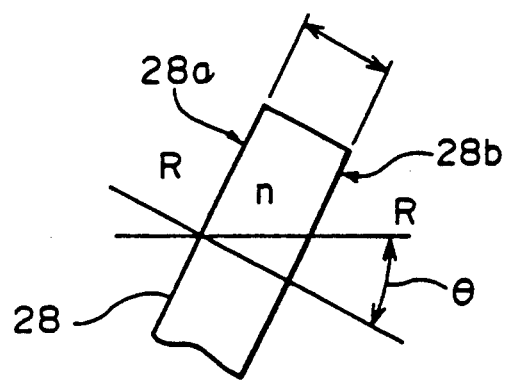
FIG. 17 is a cross-sectional view illustrating a structure of an etalon.

The etalon 28 shown in FIG. 17 is formed by coating a parallel flat plate having excellent flatness such as glass or crystal on its two surfaces with reflection films 28a and 28b, each being formed of a metal layer or dielectric multi-layer having a proper reflectivity.

Assuming that R is the reflectivity of each of the reflection films 28a and 28b, d is the whole thickness, $\theta$ is the inclination of the normal relative to the optical path and n is the refractive index, then transmissivity of the etalon 28 is expressed by the following equation:

$$T = (1-R)^2/[(1-R)^2 + 4R\sin^2(\delta/2)]$$

where $\delta$ is given by the following equation:

$$\delta = [4\pi n \, d \cos \theta]/\lambda$$

Figure 18:
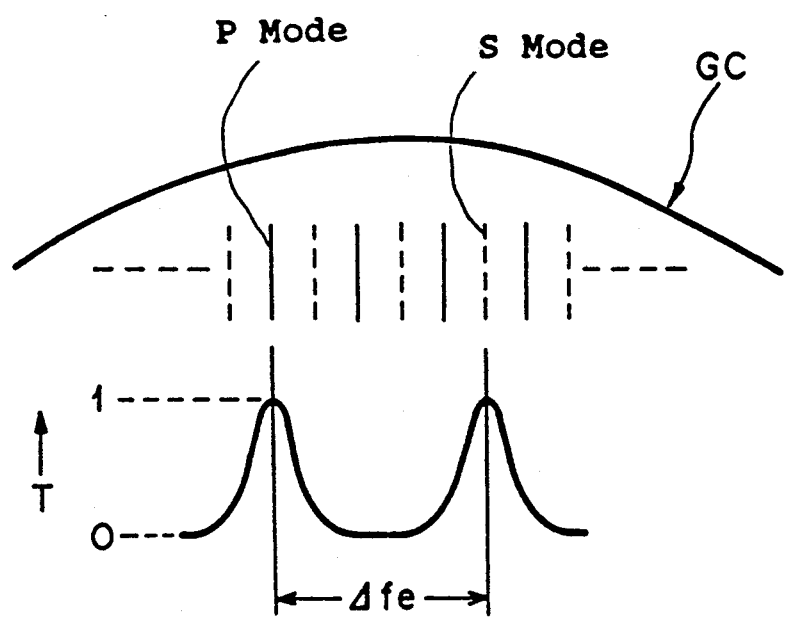
FIGS. 18 and 19 are plots, used to explain the etalon.

If $\delta$ is placed as $2m\pi$ (where m = 1, 2, 3, ..., then the transmissivity T becomes 1 (see FIG. 18). Further, a frequency interval $\Delta fe$ in which the transmissivity T becomes 1 is expressed by the following equation:

$$\Delta fe = c/2 \, n \, d \cos \theta$$

where c is the speed of light. Thus, if the frequency interval $\Delta fe$ is selected as $fe = (n + \frac{1}{2}) \Delta f$ as shown in FIG. 18, then the single mode oscillation of each of the p-mode and the s-mode becomes possible.

Figure 19:
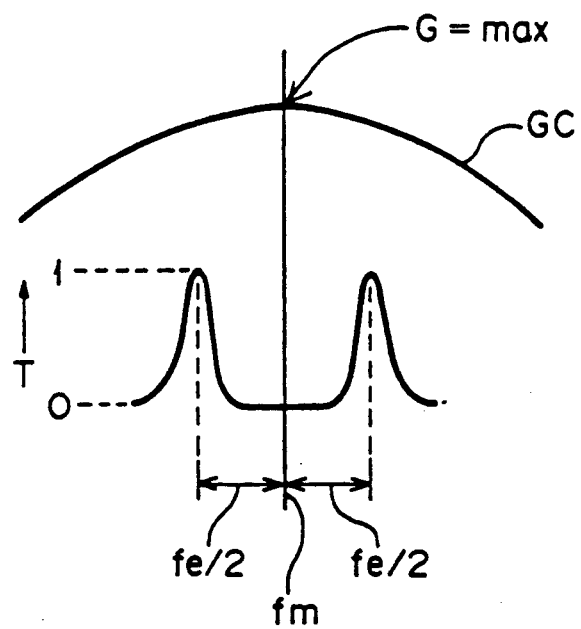

In order to balance the oscillations of the p-mode and the s-mode, it is preferable that, as shown in FIG. 19, the peaks of the transmissivity T exist at the frequencies distant by fe/2 from the respective sides of a frequency fm whose gain G becomes the maximum gain Gmax. If the thickness d of the etalon 28 is selected to be about 1 mm, then the frequency interval $\Delta fe$ becomes 150 (GHz), thus the two oscillations being effected. Also, if the reflectivity R at respective surfaces of the etalon 28 is selected to be about 50%, the adjacent mode can be suppressed sufficiently.

Figure 20:
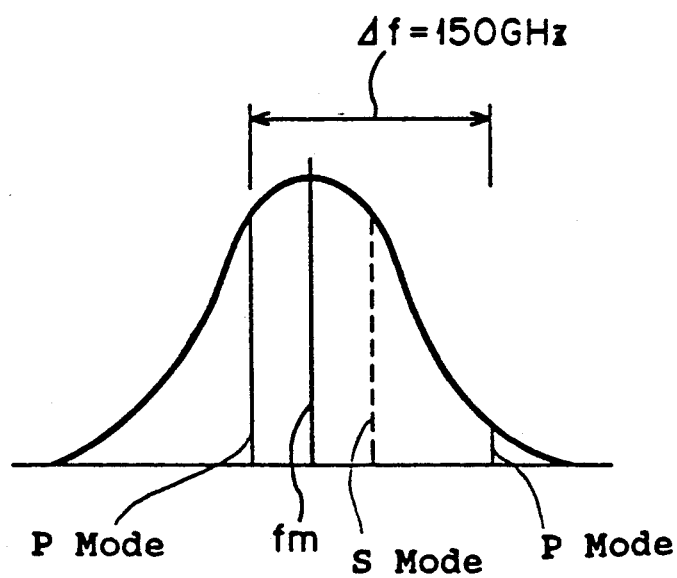
FIG. 20 is a plot used to explain a resonator whose resonator length is short.

Incidentally, the more the resonator length of the resonator RS is reduced, the wider the mode interval frequency $\Delta f$ becomes. By way of example, if the resonator length is selected to be about 1 mm in the optical path length, then the mode interval frequency $\Delta f$ becomes 150 (GHz) with the result that oscillations of only two modes will become possible relative to gain width of 180 (GHz) when the laser rod 4 is the Nd:YAG laser (see FIG. 20). Accordingly, in such case, the p-mode oscillation and the s-mode oscillation can be balanced without providing the etalon 28 within the resonator RS.

Figure 21:
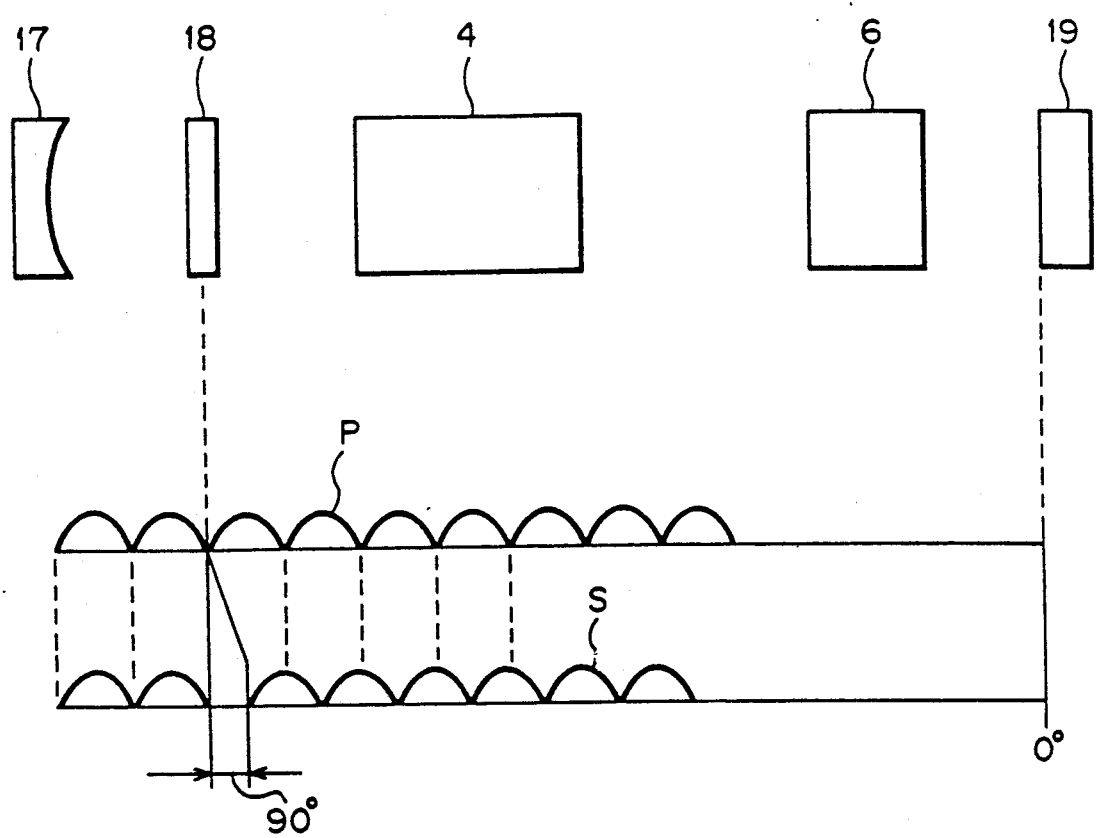
FIG. 21 is a schematic diagram used to explain how to reduce the hole-burning effect.
Figure 22:
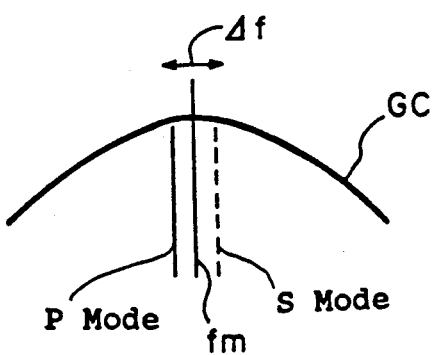
FIG. 22 is a plot used to explain single mode oscillation.

The quarter-wave plate 18 is provided between the concave mirror 17 and the laser rod 4 in the resonator RS as shown in FIG. 11. In this case, if the birefringence produced in the nonlinear optical crystal element 6 is 0°, the intrinsic polarizations are located at the azimuthal angles at ±45° and the phases thereof are displaced by 90° by the quarter-wave plate 18 (see FIG. 21). This phase displacement is reduced to 0° if the nonlinear optical crystal element 6 is located closer to the plane mirror 19. In this case, if the laser rod 4 is located close to the quarter-wave plate 18, the phase difference of 90° between the p-mode oscillation and the s-mode oscillation causes the p-mode and s-mode to oscillate in the single mode, thus making it possible to remove the space hole-burning effect. Accordingly, in such case, if the etalon 28 is not provided within the resonator RS or if the mode frequency interval $\Delta f$ of the resonator RS is not increased, then the double mode oscillation near the frequency at which the gain of the gain curve GC is maximized becomes possible (see FIG. 22).

Figure 23:
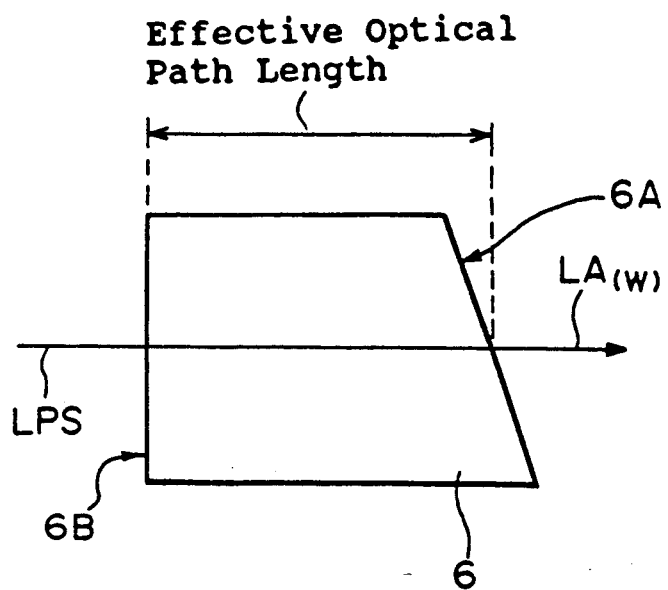
FIGS. 23 and 24 are diagrammatic views in cross section, respectively, showing nonlinear optical crystal elements having wedges.
Figure 24:
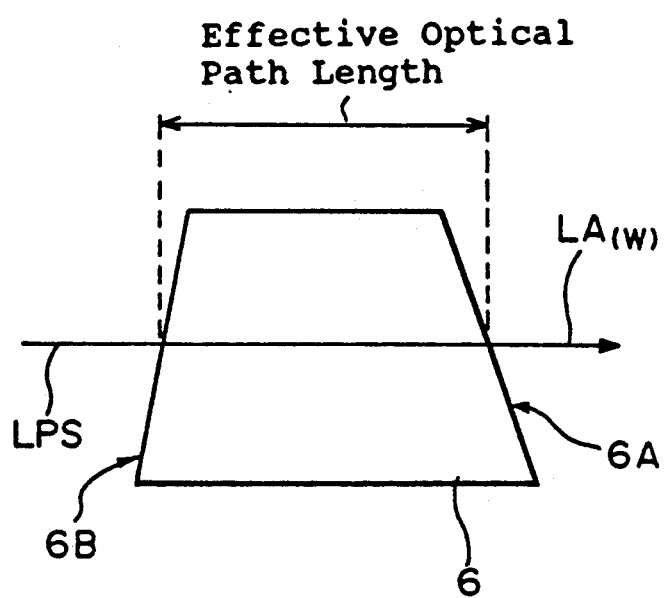

In order to make the birefringence of the nonlinear optical crystal element 6 become 0°, the nonlinear optical crystal element 6 is provided with a wedge as shown in FIG. 23 or 24.

That is, as shown in FIGS. 23 and 24, the nonlinear optical crystal element 6 has on its end face 6A opposite to the laser rod 4 an inclined plane which is inclined by a predetermined inclination angle relative to an optical path LPS. Whereas, the other end face of the nonlinear optical crystal element 6 is vertical to the optical path LPS as shown in FIG. 23 or inclined by a predetermined angle relative to the optical path LPS as shown in FIG. 24.

Figure 25:
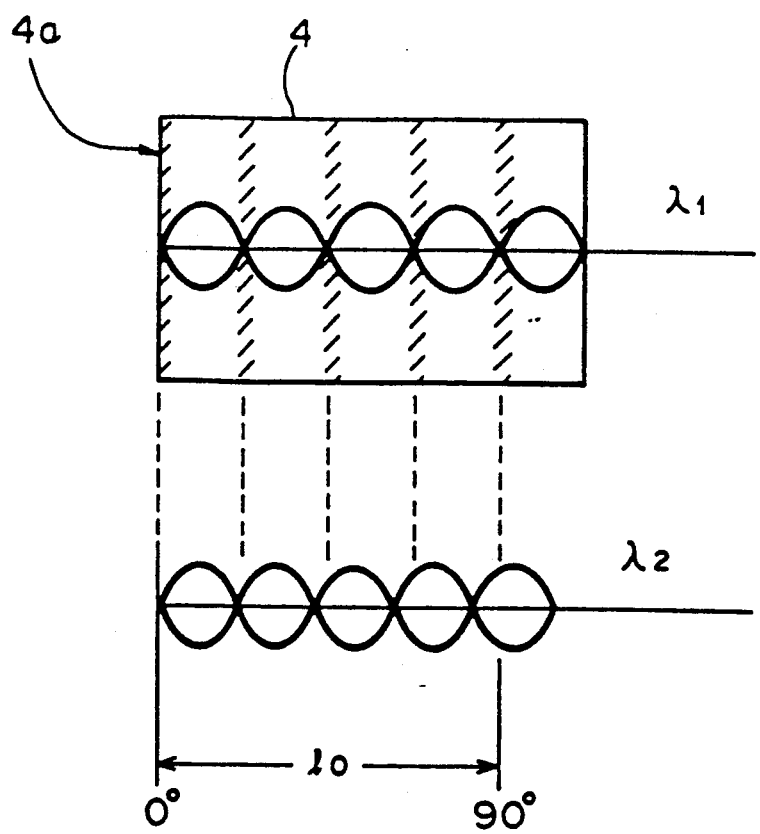
FIG. 25 is a schematic diagram showing a part of a third embodiment of the solid state laser apparatus according to the present invention.

Further, in order to reduce the hole-burning effect, as shown in FIG. 25, the laser rod (laser medium) 4 has on its end face opposing to the laser diode 1 a mirror surface 4a which is formed by the coating-process of the metal layer, the dielectric multi-layer or the like. This mirror surface 4a is used instead of the concave mirror 17 of FIG. 11 and in this case, because the mirror surface 4a is the flat mirror surface, the plane mirror 19 is replaced with the concave mirror. If the mirror surface 4a is the concave mirror surface, the plane mirror 19 need not be replaced with the concave mirror. Since the mirror surface 4a is formed on one end face of the laser medium, the unsaturated gain portion does not make a contribution to any mode, thereby the multi-mode oscillation being suppressed.

The reason for this will be described hereinafter. In this case, as shown in FIG. 25, let us consider a standing wave having mode wavelength $\lambda_2$ relative to a standard wave having a wavelength $\lambda_1$ within the laser rod 4. Also, let us assume that, after the node of the standing wave having the wavelength $\lambda_2$ coincides with the node of the standing wave having the wavelength $\lambda_1$ at the mirror surface 4a, the peak of the standing wave having the wavelength $\lambda_2$ becomes coincident with the node of the standing wave having the wavelength $\lambda_1$ at the position distant from the former position by the length $l_0$. Accordingly, if the refractive index of the laser rod 4 is taken as n and m is taken as 1, 2, 3, . . . , then the following two equations are established:

$$nl_0 = (\lambda_1/2)m$$

$$nl_0 = (\lambda_2/2)(m+\tfrac{1}{2})$$

From the above two equations, $\Delta\lambda\ (=\lambda_1-\lambda_2)$ is modified as:

$$\Delta f \approx \lambda_1^2/4nl_0$$

On the basis of the above equation, if $l_0$ is selected to be nearly 0.5 mm ($l_0 \approx 0.5$ mm), then $\Delta\lambda$ becomes nearly 0.3 nm ($\Delta\lambda \approx 0.3$ nm). Accordingly, relative to the standing wave having the wavelength $\lambda_1$, the unsaturated gain portion does not contribute to the mode of the standing wave having the wavelength $\lambda_2$ in which $\Delta\lambda$ is less than 0.3 ($\Delta\lambda$nm<0.3 nm) so that the standing wave having the wavelength $\lambda_2$ does not occur, that is, the multimode oscillation is suppressed.

According to the solid state laser apparatus of the present invention as described above, since two polarization modes of the fundamental wave laser beam are respectively oscillated in the single longitudinal mode and the oscillation intensities of the two polarization modes of the fundamental wave laser beam become the same, the occurrence of the mode hopping noise caused by the mode coupling within the same polarization mode of the fundamental wave laser beam can be avoided and the stability of oscillation can be improved.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

I claim as my invention:

1. In a solid state laser apparatus in which a fundamental wave laser beam generated in a laser medium is resonated and passes through a nonlinear optical crystal element provided within a resonator to thereby generate a secondary harmonic laser beam and in which first optical means is provided in said resonator for suppressing a coupling caused by a sum-frequency generation between two polarization modes of said fundamental wave laser beam, the improvement comprising:
   second optical means for causing said two polarization modes of said fundamental wave laser beam to respectively oscillate in a single longitudinal mode; and
   control means for controlling an effective resonator length of said resonator, whereby said two polarization modes of said fundamental wave laser beam have the same oscillation intensity.

2. A solid state laser apparatus according to claim 1, wherein said control means includes separating means for separating a first beam portion from said fundamental wave laser beam, detecting means for detecting said first beam portion of said fundamental wave laser beam separated by said separating means, and resonator length control means for controlling an effective resonator length of said resonator in response to a detected output from said detecting means.

3. A solid state laser apparatus according to claim 2, wherein a range in which said resonator is controlled by said resonator length control means is selected to be less than $\tfrac{1}{4}$ of a fundamental wave.

4. A solid state laser apparatus according to claim 1, wherein said second optical means is an optical element having a wavelength selecting property.

5. A solid state laser apparatus according to claim 1, wherein said second optical element is provided within said resonator between said laser medium and said nonlinear optical crystal element.

6. In a solid state laser apparatus in which a fundamental laser beam generated in a laser medium is resonated and passes through a nonlinear optical crystal element provided within a resonator generates a secondary harmonic laser beam and in which first optical means is provided within said resonator for suppressing a coupling caused by a sum-frequency generation between two polarization modes of said fundamental wave laser beam, the improvement comprising:
   control means for controlling an effective resonator length of said resonator, whereby said two polarization modes of said fundamental wave laser beam have the same oscillation intensity.

7. A solid state laser apparatus according to claim 6, wherein said control means includes separating means for separating a first beam portion from said fundamental wave laser beam, detecting means for detecting said first beam portion of said fundamental wave laser beam separated by said separating means, and resonator length control means for controlling an effective resonator length of said resonator in response to a detected output from said detecting means.

8. A solid state laser apparatus according to claim 7, wherein a range in which said resonator is controlled by said resonator length control means is selected to be less than $\tfrac{1}{4}$ of a fundamental wave.

9. In a solid state laser apparatus in which a fundamental laser beam generated in a laser medium is resonated and passes through a nonlinear optical crystal element provided within a resonator to thereby generate a secondary harmonic laser light and in which a birefringence optical element is provided within said resonator for suppressing a coupling caused by a sum-frequency generation between two polarization modes of said fundamental wave laser beam, the improvement comprising:

optical means provided within said resonator for causing said two polarization modes of said fundamental wave laser beam to respectively oscillate in a single longitudinal mode.

10. A solid state laser apparatus according to claim 9, wherein said optical means is an optical element having a wavelength selecting property.

11. A solid state laser apparatus according to claim 10, wherein said optical element is provided within said resonator between said laser medium and said nonlinear optical crystal element.

* * * * *